US007408680B2

(12) United States Patent
Miyake et al.

(10) Patent No.: US 7,408,680 B2
(45) Date of Patent: Aug. 5, 2008

(54) IMAGE PROCESSING APPARATUS AND METHOD

(75) Inventors: Nobutaka Miyake, Kanagawa (JP); Kiyoshi Umeda, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1054 days.

(21) Appl. No.: 10/247,519

(22) Filed: Sep. 20, 2002

(65) Prior Publication Data

US 2003/0058480 A1 Mar. 27, 2003

(30) Foreign Application Priority Data

Sep. 26, 2001 (JP) ............................. 2001-293851
Sep. 9, 2002 (JP) ............................. 2002-262821

(51) Int. Cl.
*G06K 15/00* (2006.01)
*H04N 1/40* (2006.01)
(52) U.S. Cl. .................... 358/3.28; 358/3.01; 358/3.06; 382/100
(58) Field of Classification Search ................ 358/1.18, 358/1.9, 3.01, 3.06, 3.28; 382/100; 380/54, 380/55

See application file for complete search history.

(56) References Cited

U.S. PATENT DOCUMENTS

| 5,652,626 | A |   | 7/1997 | Kawakami et al. | .......... 348/463 |
| 5,930,369 | A | * | 7/1999 | Cox et al. | ...................... 380/54 |
| 7,054,461 | B2 | * | 5/2006 | Zeller et al. | .................. 382/100 |
| 7,065,226 | B1 | * | 6/2006 | Anzai et al. | .................. 382/100 |
| 7,095,526 | B1 | * | 8/2006 | Housel | ....................... 358/1.18 |
| 2002/0076086 | A1 | * | 6/2002 | Yoshiura et al. | ............. 382/100 |
| 2002/0146120 | A1 | * | 10/2002 | Anglin | ......................... 380/54 |

FOREIGN PATENT DOCUMENTS

| JP | 7-123244 | 5/1995 |
| JP | 2640939 | 5/1997 |
| JP | 2777800 | 5/1998 |
| JP | 2001-292283 | 10/2001 |

OTHER PUBLICATIONS

Judice, "Introduction to Special Issue on Processing of Images for Bilevel Displays and the Generation of Pseudo-Gray Scale," Proceedings of the S.I.D. (Society for Information Display), vol. 17/2, Second Quarter, 1976, p. 62.
Floyd, et al., "An Adaptive Algorithm for Spatial Greyscale," Proceedings of the S.I.D. (Society for Information Display), vol. 17/2, Second Quarter, 1976, pp. 75-77.

* cited by examiner

*Primary Examiner*—Edward L. Coles
*Assistant Examiner*—James A Thompson
(74) *Attorney, Agent, or Firm*—Fitzpatrick, Cella, Harper & Scinto

(57) ABSTRACT

There is disclosed an image processing apparatus developed considering that an embedding or extracting method has not heretofore been changed based on a spatial coordinate on a recording medium or reading device, the apparatus comprising: an input unit for inputting an image, an embedding unit for embedding predetermined information to the inputted image by a predetermined embedding method, an image formation unit for forming the image to which the predetermined information is embedded on the recording medium, and a changeover unit for changing the embedding method by the embedding unit based on the spatial coordinate of the recording medium.

20 Claims, 19 Drawing Sheets

FIG. 9A

|   | N |   |
|---|---|---|
| M | QUANTIZATION CONDITIONS A | QUANTIZATION CONDITIONS B |
|   | QUANTIZATION CONDITIONS B | QUANTIZATION CONDITIONS A |

FIG. 9B

|   | N |   |
|---|---|---|
| M | QUANTIZATION CONDITIONS B | QUANTIZATION CONDITIONS A |
|   | QUANTIZATION CONDITIONS A | QUANTIZATION CONDITIONS B |

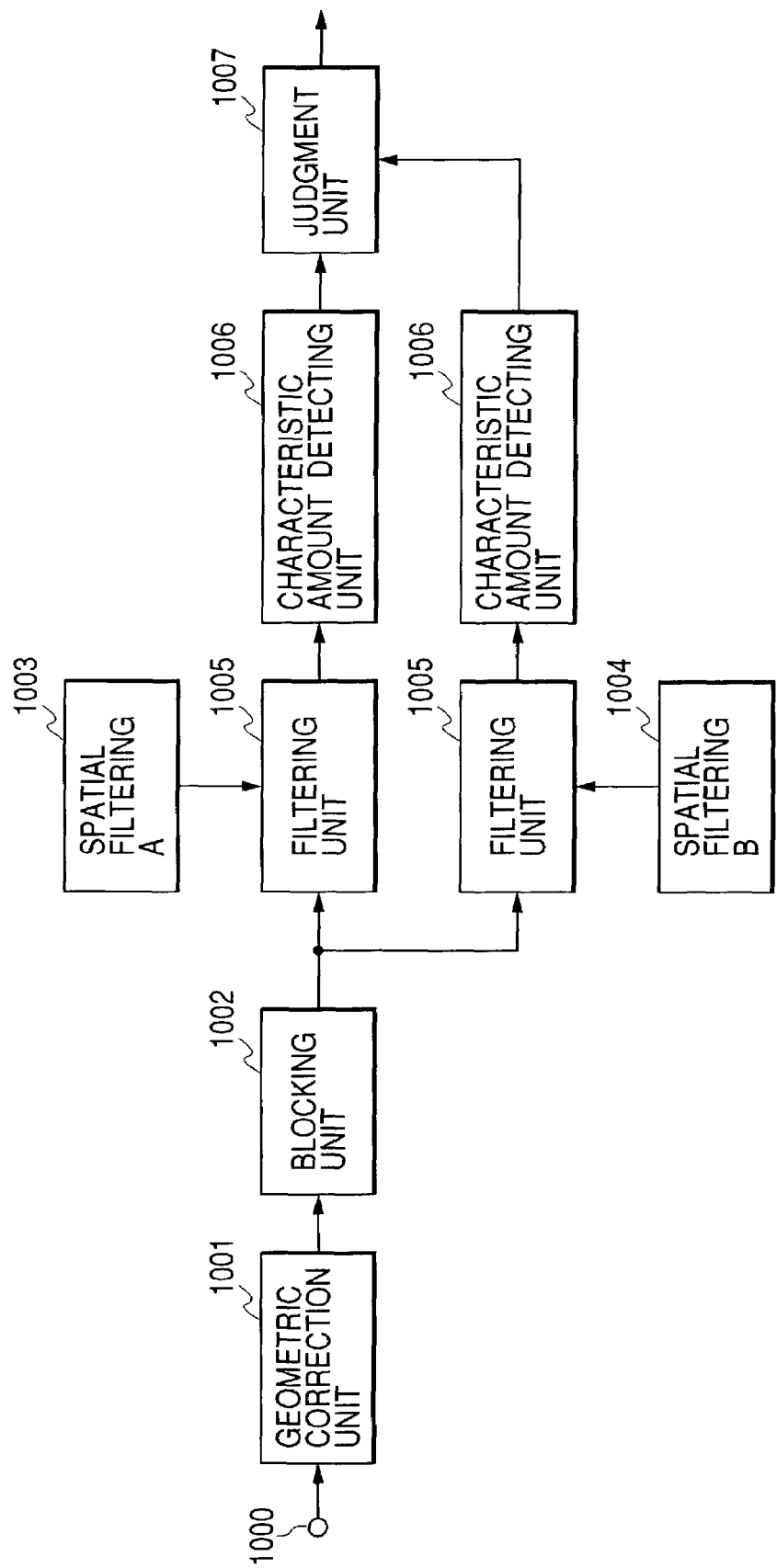

FIG. 11A

|  |  |  | −1 | −1 |
|---|---|---|---|---|
|  | −1 | −1 | 2 | 2 |
| −1 | 2 | 2 | −1 | −1 |
| 2 | −1 | −1 |  |  |
| −1 |  |  |  |  |

FIG. 11B

|  |  | −1 | 2 | −1 |
|---|---|---|---|---|
|  |  | −1 | 2 | −1 |
|  | −1 | 2 | −1 |  |
|  | −1 | 2 | −1 |  |
| −1 | 2 | −1 |  |  |

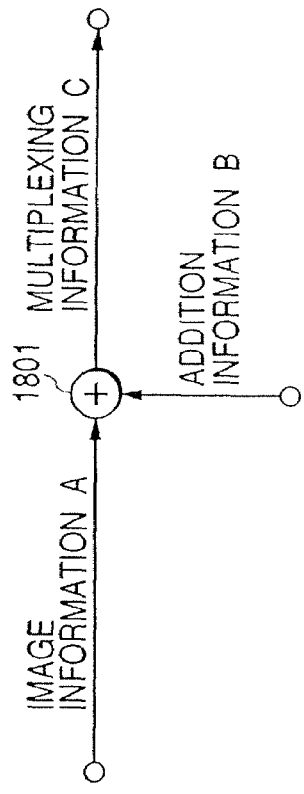
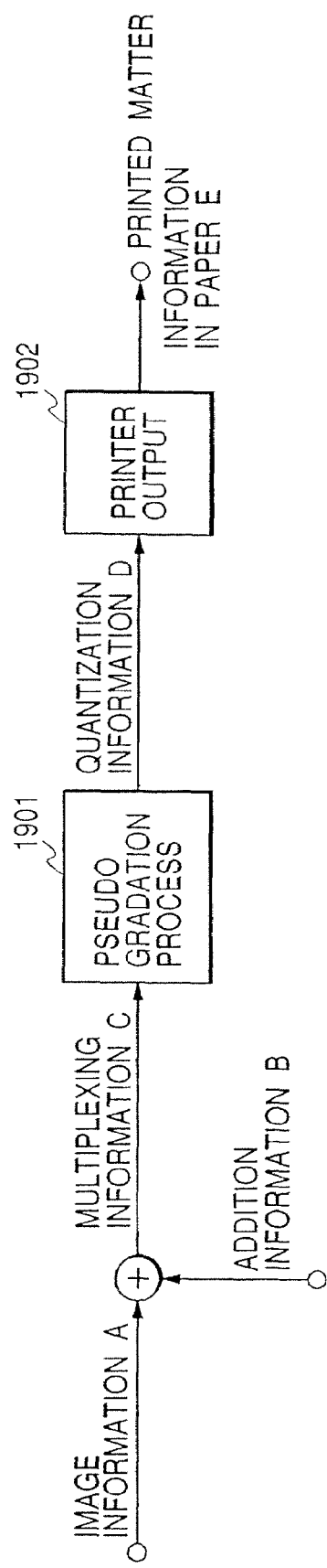

IMAGE PROCESSING APPARATUS AND METHOD

BACKGROUND OF THE INVENTION

1. Field of the Invention

The present invention relates to an image processing apparatus and method.

2. Related Background Art

Researches for multiplexing other information related to an image in image information have heretofore intensively been performed. In resent years, a technique called a digital watermark technique has been standardized. This technique comprises: multiplexing addition information such as an author name and permission/prohibition of use into the image information such as a photograph and picture so that the addition information is not easily visually distinguished; and distributing the information through a network such as Internet.

Moreover, as another application field, with improvement of image quality of image output apparatuses such as a copying machine and printer, for a purpose of preventing illegal counterfeiting of paper money, stamp, and securities, there has been proposed a technique of embedding the addition information into an image in order to specify an output apparatus and apparatus serial number from the image outputted onto paper.

For example, in Japanese Patent Application Laid-Open No. 7-123244, a technique has been proposed which comprises: embedding the additional information in a color-difference component low in visual sensitivity, and a high-frequency range of a chroma component to multiplex the information.

However, the above-described techniques have the following problems. FIG. 18 shows a general embedding of the additional information of the digital watermark technique. Image information A and additional information B are multiplexed via an adder 1801, and changed to multiplexed information C. FIG. 18 shows an example in which the additional information is multiplexed in a real space area of the image information. If it is possible to bring the multiplexed information C into circulation without any image processing such as various types of filtering, or any coding such as nonreversible compression, it is also easy to decode the additional information B from the multiplexed information C even in a conventional technique. For the image information which is brought into circulation on Internet and which has some resistance to noise, it is possible to decode the information even through a digital filter for image quality improvements such as edge emphasizing and smoothing.

However, it is now assumed that the multiplexed image is printed by output apparatuses such as the printer and the additional information is extracted from printed matter. Furthermore, a printer output from the printer for use which only has a representation capability of about two to several gradations per color is assumed. In recent years, an ink jet printer has been brought on the market which uses an ink having a low dye density, or variably controls a dot diameter to output, and can represent several gradations per color. However, unless a pseudo gradation process is used, gradation properties of a photographic image cannot be represented.

That is, on the above-described assumption that the multiplexed image is outputted via the printer using the digital watermark technique of FIG. 18, as shown in FIG. 19, the multiplexed information C changes to quantization information D by a pseudo gradation process unit 1901, is thereafter printed onto paper by a printer output unit 1902, and thereby changes much deteriorated information in paper F (printed matter). Therefore, when the addition information is decoded from the information in paper for the above-described purpose of counterfeit prevention, the addition information B is decoded from the information in paper E after a series of processes of FIG. 19. A change amount of the information by the processes of both units 1901, 1902 is very large, and it is very difficult to multiplex the addition information such that the information cannot visually be distinguished, and to correctly decode the multiplexed addition information on paper.

Moreover, FIG. 20 shows an example of the conventional digital watermark technique. In this example, the real space area is not used, and the image information is converted to a frequency area using Fourier transform and synthesized in a high-frequency range. In FIG. 20 the image information is converted to a frequency area by an orthogonal transformation unit 2001, and the addition information is added to a specific frequency which is not easily visually distinguished by an adder 2002. After the area is returned again to the real space area by a reverse orthogonal transformation unit 2003, similarly as the example of FIG. 18 the information is passed through the filter including large changes such as the pseudo gradation process unit and printer output unit.

FIG. 21 shows a process of separating the addition information from paper. That is, the information of the printed matter is inputted via an image reading unit 2101 such as a scanner of the printed matter. Since the inputted information is the image represented in the gradations by the pseudo gradation process unit, the image is passed through a restoration process unit 2102 as a reverse pseudo gradation process unit. In a restoration process, it is general to use a low pass filter (LPF). After the restored information is subjected to an orthogonal transformation process by a unit 2103, the embedded addition information is separated from a power having a specific frequency in a separation process unit 2104.

It is apparently seen from FIGS. 20, 21 that a large number of complicated process steps are required for multiplexing and separating the addition information. For a color image, this series of process steps also include a color change process of changing to a color peculiar to the printer. In order to realize satisfactory separation even in these complicated process steps, a signal having a very strong resistance has to be inputted. It is difficult to input the signal high in resistance while maintaining a satisfactory image quality. Moreover, with a large number of complicated process steps, a process time required for multiplexing and separating the information becomes very long.

Furthermore, in the Japanese Patent Application Laid-Open No. 7-123244, the information is added to the high-frequency area. However, when an error diffusion method is carried out in the subsequent pseudo gradation process, by characteristics of a high pass filter peculiar to the error diffusion method, a band of addition information is buried in a band of texture generated in the error diffusion, and there are possibilities of failure in decoding. Furthermore, a scanner apparatus with a very high precision is required for the decoding. That is, when the pseudo gradation process is a precondition, the method of FIGS. 19, 20 is found to be inappropriate. In other words, a multiplexing method of the addition information is required in which the characteristics of the pseudo gradation process are made heavy use of.

An example of a combination of the multiplexing of the addition information with redundancy of the pseudo gradation process is described in Japanese Patent Nos. 2640939, 2777800.

In the former proposal, for the binarizing in an organized dither method, any one is selected from dither matrices indicating the same gradation, and thereby data is mixed into the image signal.

However, in the organized dither method, unless the printer has a high resolution or very superior in mechanical precision, it is difficult to output an image having a high photographic image quality. Some deviation of the mechanical precision is generated as a low-frequency noise such as transverse streaks, and easily visually recognized on paper. Moreover, when the dither matrices are periodically changed, the band with a specific frequency is disturbed by regularly arranged dithers, and the image quality is adversely influenced.

Furthermore, gradation representation capabilities largely differ with the type of the dither matrix. Particularly on paper, a change of area ratio in an overlap of dots differs with the dither matrix. Therefore, it is also considered that a change of density is made by changing the dither matrix even in an area having a uniform density on the signal. Additionally, in a decode method of presuming the dither matrix used in the binarizing while a pixel value of the image information as an original signal is unclear on a decode (separation) side, there is a very high possibility of an incorrect decoding.

Moreover, the latter proposal relates to a method of using a dither pattern method of color to multiplex the addition information by arrangement of patterns. Even in this method, similarly as the former proposal, image quality deterioration by the changing is unavoidable. Furthermore, as compared with the former proposal, more addition information can be multiplexed, but the arrangement of color components is changed to bring about a change of hue, and the image quality is largely deteriorated particularly in a flat portion. It is also expected that the decoding on paper becomes further difficult.

In any case, both the methods of changing the dither matrix have a problem that the image quality is largely deteriorated but the decoding is difficult.

To solve the problem, the applicant of the present invention has proposed a method of using the texture generated beforehand by the error diffusion method to artificially prepare a combination of quantization values which cannot be generated in a usual pseudo gradation process, and embedding a code.

In this method, since a shape of texture only somewhat changes in a micro manner, the image quality is not visually deteriorated. Moreover, when a method of changing a quantization threshold value of the error diffusion method is used, a density value of area gradation is visually kept. Therefore, the multiplexing of various types of signals can remarkably easily be realized.

However, according to the above-described proposal, it has to be judged whether or not the texture is artificial on the decode side. In the printed matter outputted on paper, it is sometimes impossible to satisfactorily reproduce the texture by deviation from a desired shot spot position because of slippage of dots.

Moreover, in the color image, a method of multiplexing the color image in color components having a lowest visual sensitivity is a mainstream, but the distinction of the texture in the real space area is easily influenced by other color components, and it becomes difficult to separate the multiplexed information.

Furthermore, in order to solve the above-described problem, the present applicant has proposed a method of modulating amplitude of the quantization threshold value of the error diffusion method with a predetermined periodicity, controlling a plurality of types of periodicity of the threshold value modulation by an area unit, thereby controlling generation probability of the quantization value of the pseudo gradation process, and embedding the code based on the periodicity.

In the method, as compared with the above-described method of distinguishing the position and shape of the texture, relative power information in a plurality of predetermined frequency bands is an important decode factor, rather than phase information forming the code. Therefore, satisfactory decoding can be realized even on paper.

Problem to be Solved by the Invention

However, the above-described proposal has the following problem. That is, some printer for preparing the printed matter is not superior in mechanical precision.

When an ink jet printer is assumed, ink is flied and attached to a recording medium, but naturally a flied ink drop frequently deviates from the assumed shot spot position. When the slippage of the dot is generated on one line during conveyance of a recording sheet, the slippage visually becomes excessively conspicuous. Therefore, a method of reducing recoding density on the same line, and printing the information with a plurality of scans by a plurality of nozzles is general.

On the other hand, by the mechanical constitution of the printer, when the recording sheet rushes in each roller for use in conveyance, or the recording sheet comes off the roller in a step of conveying the recording sheet, the image quality is sometimes disturbed by impact vibration of the recording sheet in course of printing. As described above, since the information is printed on the same line with a plurality of divided scans in many cases, disturbance of the printing also influences a plurality of lines, and the image quality is deteriorated with a predetermined width on paper.

Moreover, there is a possibility that even left and right ends of the recording sheet are inferior in printing precision to a recording sheet center portion. That is, the image quality is not uniform on paper, and relatively satisfactory and inferior portions exist by the mechanical constitution peculiar to the printer. The portion inferior in the image quality can be regarded as a portion in which mechanical noise components are superimposed upon the image information.

When the separation of the addition information from the printed matter by the above-described proposal of the present applicant is considered, the decoding (extracting) sometimes becomes difficult in a nonuniform image quality on paper. That is, in the portion in which the image quality is relatively satisfactory, the addition information can easily be separated. However, in the portion in which the image quality is inferior, there is a possibility of failure in the separation because of the superimposed noise.

However, if the whole image is securely multiplexed in order to avoid the failure in separation, the image quality deterioration by the multiplexing becomes conspicuous. Moreover, when a decode method having a high precision is used over the whole surface of paper in order to avoid the failure of separation, a process time increases even on the decode side.

SUMMARY OF THE INVENTION

The present invention has been developed to solve the above-described problems, and an object of the present invention is to provide an image processing apparatus and method in which an embedding or extracting method is changed based on a spatial coordinate on a recording medium or reading apparatus, and thereby extraction precision in an extraction time, optimization of the extraction time, and optimum design of image quality can be realized.

To achieve the object, according to the present invention, there is provided an image processing apparatus comprising: input means for inputting an image; embedding means for embedding predetermined information with respect to the inputted image by a predetermined embedding method; image formation means for forming the image with the predetermined information embedded therein in a recording medium; and changeover means for changing the embedding method by the embedding means based on a spatial coordinate of the recording medium.

Moreover, to achieve the object, according to the present invention, there is provided an image processing method comprising: an input step of inputting an image; an embedding step of embedding predetermined information with respect to the inputted image by a predetermined embedding method; an image formation step of forming the image with the predetermined information embedded therein in a recording medium; and a changeover step of changing the embedding method based on a spatial coordinate of the recording medium.

Furthermore, to achieve the object, according to the present invention, there is provided an image processing apparatus comprising: input means for inputting an image in which predetermined information is embedded; extraction means for extracting the predetermined information from the inputted image by a predetermined extraction method; and changeover means for changing the extraction method by the extraction means based on a spatial coordinate of the recording medium.

Additionally, to achieve the object, according to the present invention, there is provided an image processing method comprising: an input step of inputting an image in which predetermined information is embedded; an extraction step of extracting the predetermined information from the inputted image by a predetermined extraction method; and a changeover step of changing the extraction method based on a spatial coordinate of the recording medium.

Moreover, to achieve the object, according to the present invention, there is provided an image processing apparatus comprising: input means for optically reading a recording medium in which an image with predetermined information embedded therein is formed and inputting the image; extraction means for extracting the predetermined information from the inputted image by a predetermined extraction method; and changeover means for changing the extraction method by the extraction means based on a spatial coordinate optically read by the input means.

Furthermore, to achieve the object, according to the present invention, there is provided an image processing method comprising: an input step of optically reading a recording medium in which an image with predetermined information embedded therein is formed and inputting the image; an extraction step of extracting the predetermined information from the inputted image by a predetermined extraction method; and a changeover step of changing the extraction method by the extraction step based on a spatial coordinate optically read by the input step.

Additionally, to achieve the object, according to the present invention, there is provided an image processing apparatus comprising: input means for inputting an image; embedding means for embedding predetermined information with respect to the inputted image by a predetermined embedding method; image formation means for forming the image in which the predetermined information is embedded in a recording medium; and changeover means for changing the embedding method by the embedding means based on a spatial distance from an end of the image.

Moreover, to achieve the object, according to the present invention, there is provided an image processing method comprising: an input step of inputting an image; an embedding step of embedding predetermined information with respect to the inputted image by a predetermined embedding method; an image formation step of forming the image in which the predetermined information is embedded in a recording medium; and a changeover step of changing the embedding method by the embedding step based on a spatial distance from an end of the image.

Furthermore, to achieve the object, according to the present invention, there is provided an image processing apparatus comprising: input means for inputting an image in which predetermined information is embedded; extraction means for extracting the predetermined information from the inputted image by a predetermined extraction method; and changeover means for changing the extraction method by the extraction means based on a spatial distance from an end of the image.

Additionally, to achieve the object, according to the present invention, there is provided an image processing method comprising: an input step of inputting an image in which predetermined information is embedded; an extraction step of extracting the predetermined information from the inputted image by a predetermined extraction method; and a changeover step of changing the extraction method by the extraction step based on a spatial distance from an end of the image.

Further function and characteristics of the present invention will be apparent from the following drawings and embodiments.

BRIEF DESCRIPTION OF THE DRAWINGS

FIGS. 9A and 9B show an arrangement example of a combination of the quantization conditions;

FIG. 10 is a major part block diagram showing a constitution of an addition information separating device of FIG. 1;

FIGS. 11A and 11B show one example of spatial filtering;

FIG. 18 is a block diagram showing one example of multiplexing of a conventional method;

FIG. 19 is a block diagram showing one example of multiplexing of the conventional method;

DESCRIPTION OF THE PREFERRED EMBODIMENTS

One embodiment of the present invention will be described hereinafter in detail with reference to the drawings. It is to be noted that it is efficient to incorporate an image processing apparatus in the present embodiment mainly as printer driver software or application software in a computer for preparing image information to be outputted to a printer engine, but that it is also effective to incorporate the apparatus as hardware and software in a copying machine, facsimile device, and printer main body.

First Embodiment

Figure 1:
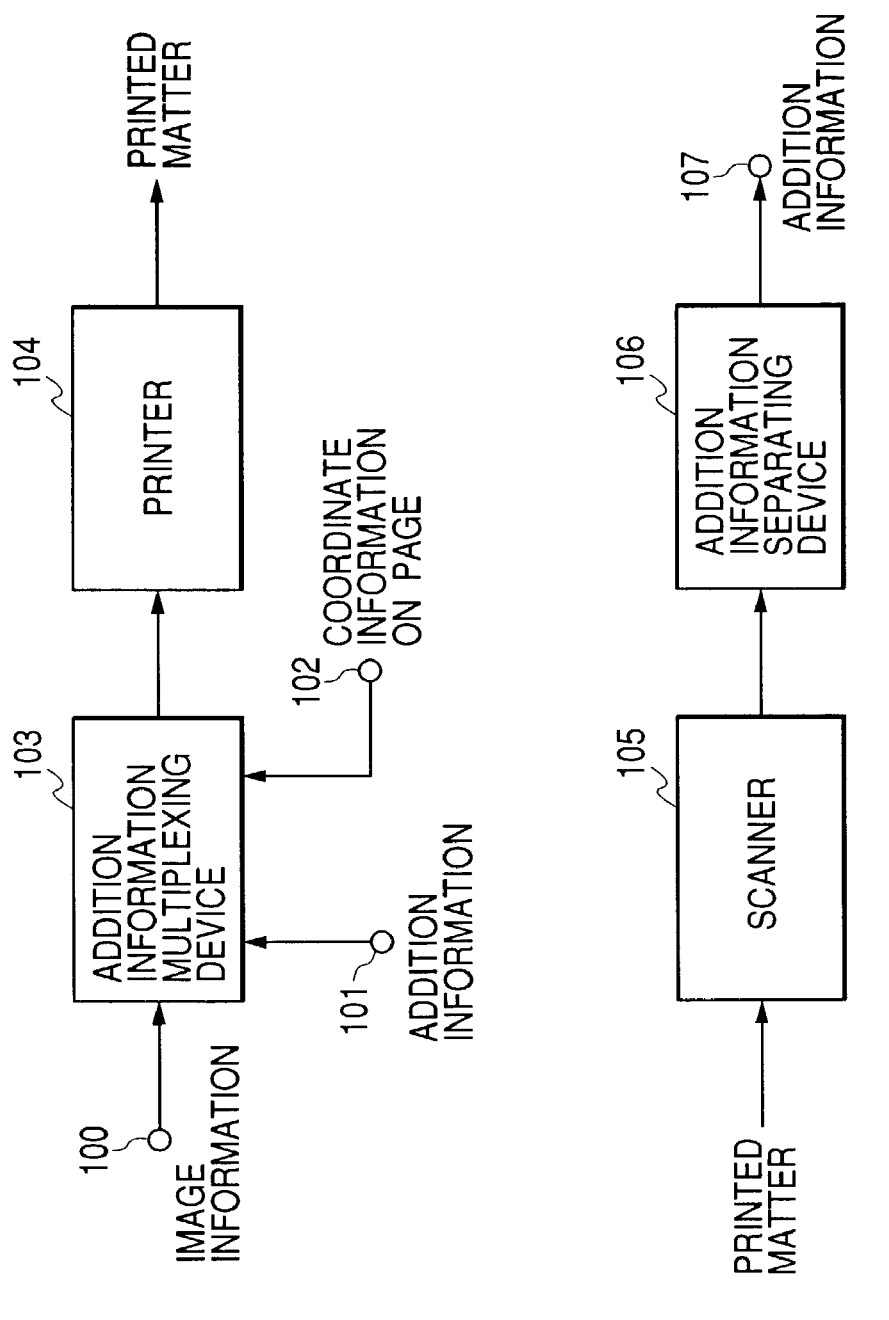
FIG. 1 is a major part block diagram showing a constitution of an image processing apparatus in a first embodiment.

FIG. 1 is a block diagram showing a constitution of an image processing system of a first embodiment.

Reference numerals 100, 101, 102 denote input terminals, multi-gradation image information is inputted via the input terminal 100, and necessary addition information to be embedded in the image information is inputted via the input terminal 101.

Examples of the Addition Information Include:

information other than the image information inputted via the input terminal 100, such as sound data and text document information; miscellaneous information concerning an image inputted via the input terminal 100, such as copyright, photography date, photography place, and photographer; and other image information. Various applications are considered.

Coordinate information on page indicating a layout of image or document text in one page onto which the image information is outputted is inputted via the input terminal 102. The layout in the page can easily be prepared by the application software for freely arranging the image or document text. It is also naturally possible to arrange only the images on the whole surface of paper without including document text information such as characters in the page.

Reference numeral 103 denotes an addition information multiplexing device to embed addition information in the image information so that the information is not easily visually distinguished. The addition information multiplexing device 103 not only multiplexes the addition information but also quantizes the inputted multi-gradation image information.

Reference numeral 104 denotes a printer which outputs the information prepared by the addition information multiplexing device 103 in a printer engine. For the printer 104, printers for using a pseudo gradation process to realize gradation representation are assumed such as an ink jet printer and laser printer.

For an outputted printed matter, a scanner 105 is used to read the information on the printed matter, and an addition information separating device 106 separates the addition information embedded in the printed matter and outputs the information via an output terminal 107.

Figure 2:
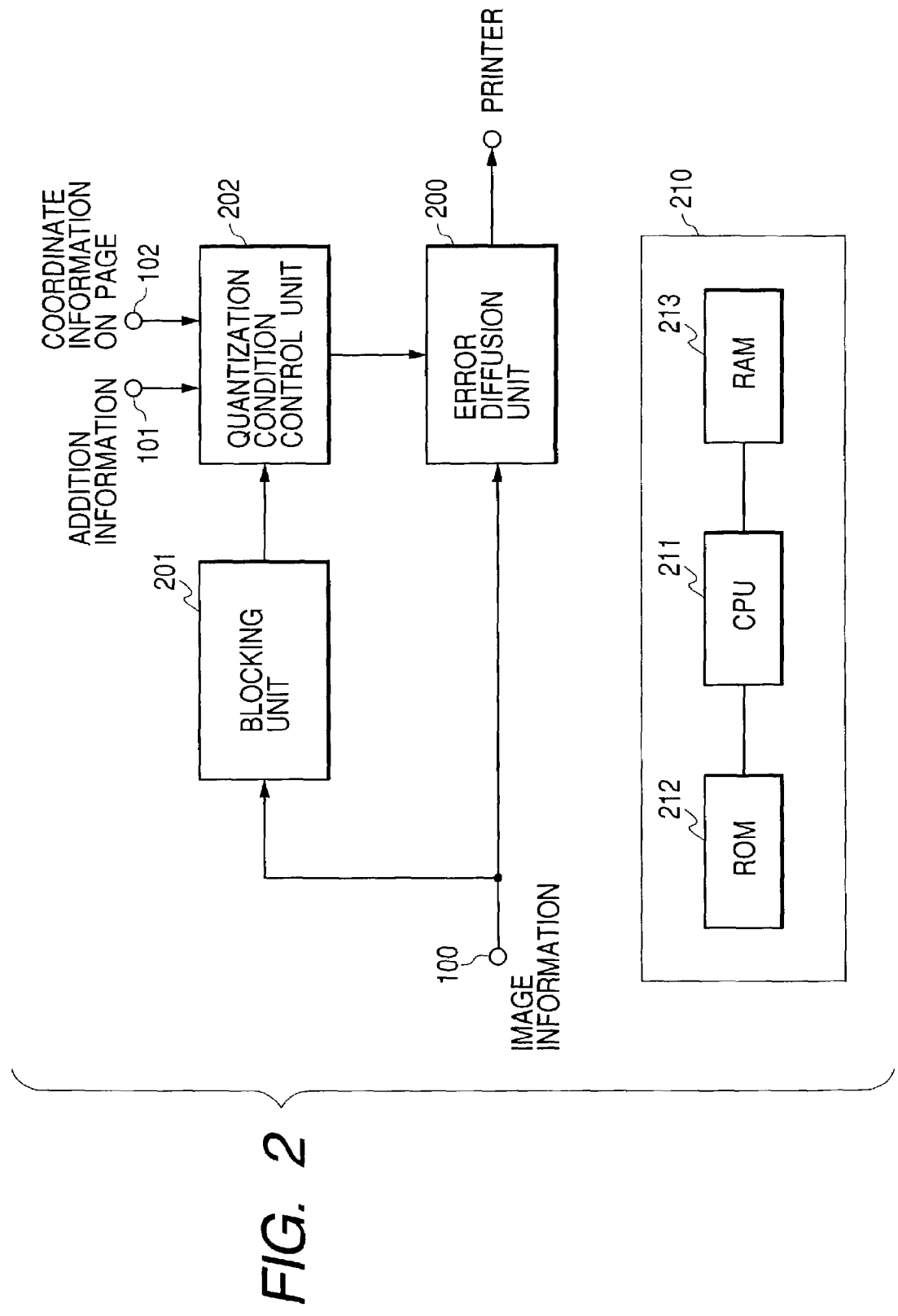
FIG. 2 is a major part block diagram showing a constitution of an addition information multiplexing device of FIG. 1.

FIG. 2 is a block diagram showing a constitution of the addition information multiplexing device 103 of FIG. 1.

Reference numeral 200 denotes an error diffusion unit for subjecting the inputted image information to a pseudo gradation process using an error diffusion method, thereby converting the information to a quantization level less than an input gradation number, and representing gradation properties by quantization values of a plurality of pixels in an area manner. Details of the error diffusion process will be described later.

Reference numeral 201 denotes a blocking unit that divides the inputted image information into predetermined area units. In this blocking, the information may be divided into rectangular areas or areas having shapes other than the rectangular shape.

Reference numeral 202 denotes a quantization condition control unit which changes/controls quantization conditions by an area unit blocked by the blocking unit 201. The quantization condition control unit 202 controls the quantization conditions by the block unit based on the addition information inputted via the input terminal 101 and the coordinate information on page of the image information inputted via the input terminal 102.

Reference numeral 210 denotes a control unit including a CPU 211, an ROM 212, an RAM 213, and the like.

The CPU 211 controls operations and processes of the above-described constitutions in accordance with control program held by the ROM 212. The RAM 213 is used as an operation area of the CPU 211.

Figure 3:
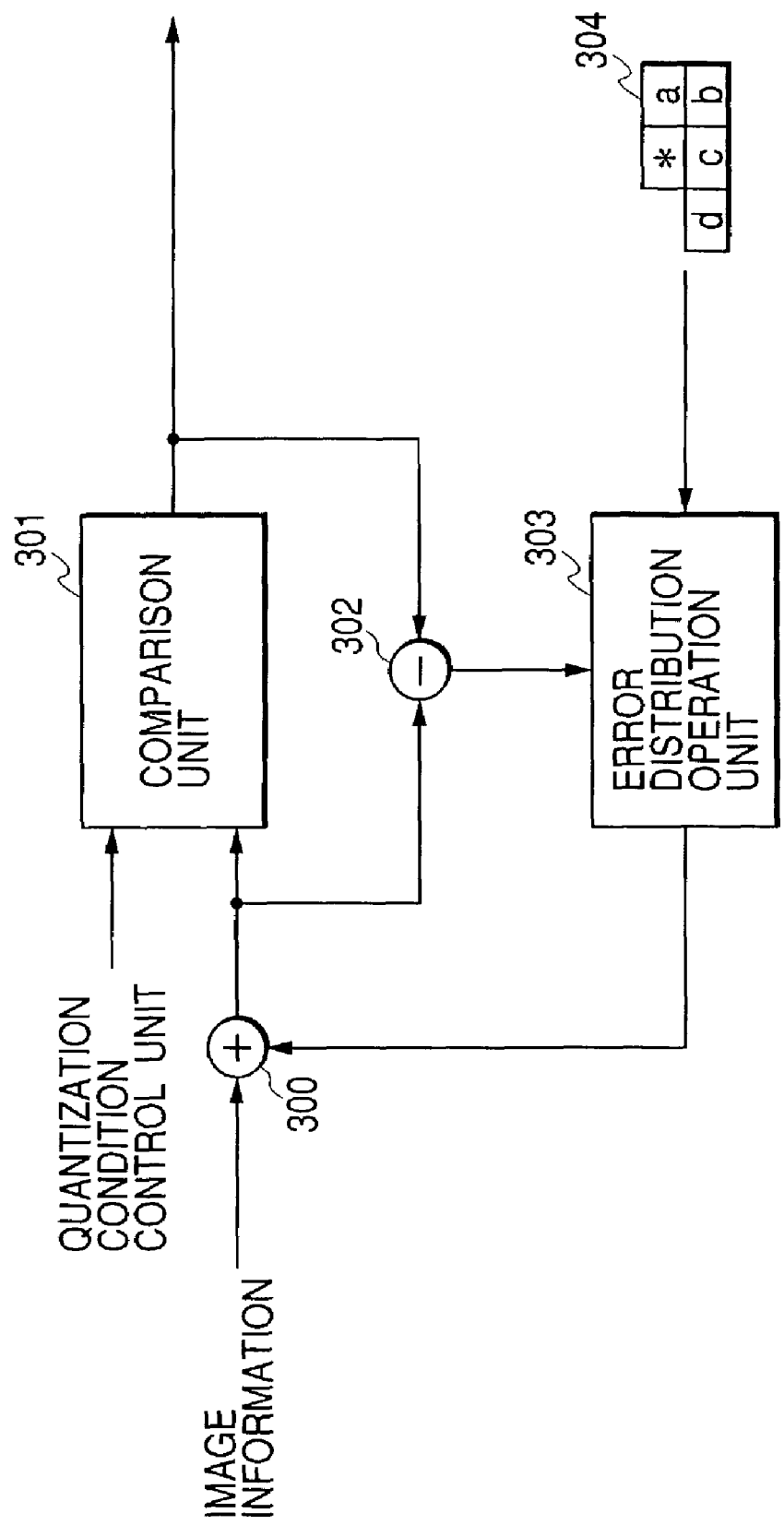
FIG. 3 is a major part block diagram showing an error diffusion unit of FIG. 2.

FIG. 3 is a block diagram showing details of the error diffusion unit 200. Details of a general error diffusion process are described in a document by R. Floyd & L. Steinberg: "An Adaptive Algorithm for Spatial Grayscale", SID Symposium Digest of Paper pp. 36 to 37 (1975).

An example of the error diffusion process in which the quantization value is binary will now be described. It is to be noted that the quantization value is not limited to the binary value and may also be multi-valued such as ternary and four-valued.

Reference numeral 300 denotes an adder that adds a noted pixel value of the inputted image information and a distributed quantization error of a binarized peripheral pixel. A comparison unit 301 compares a quantization threshold value from the quantization condition control unit 202 with an addition result with the error added thereto, outputs "1", when the result is larger than a predetermined threshold value, and outputs "0" in other cases. For example, when the gradation of pixels is represented with a precision of eight bits, it is general to represent the gradation with a maximum value "255" and minimum value "0". It is now assumed that dots (an ink, a toner, and the like) are printed on paper with a quantization value of "1".

Reference numeral 302 denotes a subtracter that calculates an error between a quantization result and the above-described addition result, and distributes the error to the peripheral pixels to be subjected to a subsequent quantization process based on an error distribution operation unit 303. For a distribution ratio of the errors, a distribution table 304 of the errors experimentally set based on a relative distance from the noted pixel is possessed beforehand, and the errors are distributed based on the distribution ratio described in the distribution table.

The distribution table 304 of FIG. 3 is a distribution table for four peripheral pixels, but is not limited to this table.

The whole operation procedure including the quantization condition control unit 202 will next be described with reference to a flowchart of FIG. 4. An example in which the quantization value is binary will now be described. It is to be noted that the quantization value is not limited to the binary value and may also be multi-valued such as ternary and four-valued.

S401 indicates initialization of a variable i. The variable i is a variable to count addresses in a vertical direction.

S402 indicates initialization of a variable j. The variable j is a variable to count addresses in a horizontal direction. Both the variables i, j are a relative coordinate from a start point of the image information (left upper point of the image).

Subsequently, in S403 as a judgment step by address values of i, j, it is judged whether or not the coordinate of i, j as a present process address belongs to an area to be subjected to a multiplexing process.

A multiplexing area will be described with reference to FIG. 5.

Figure 5:
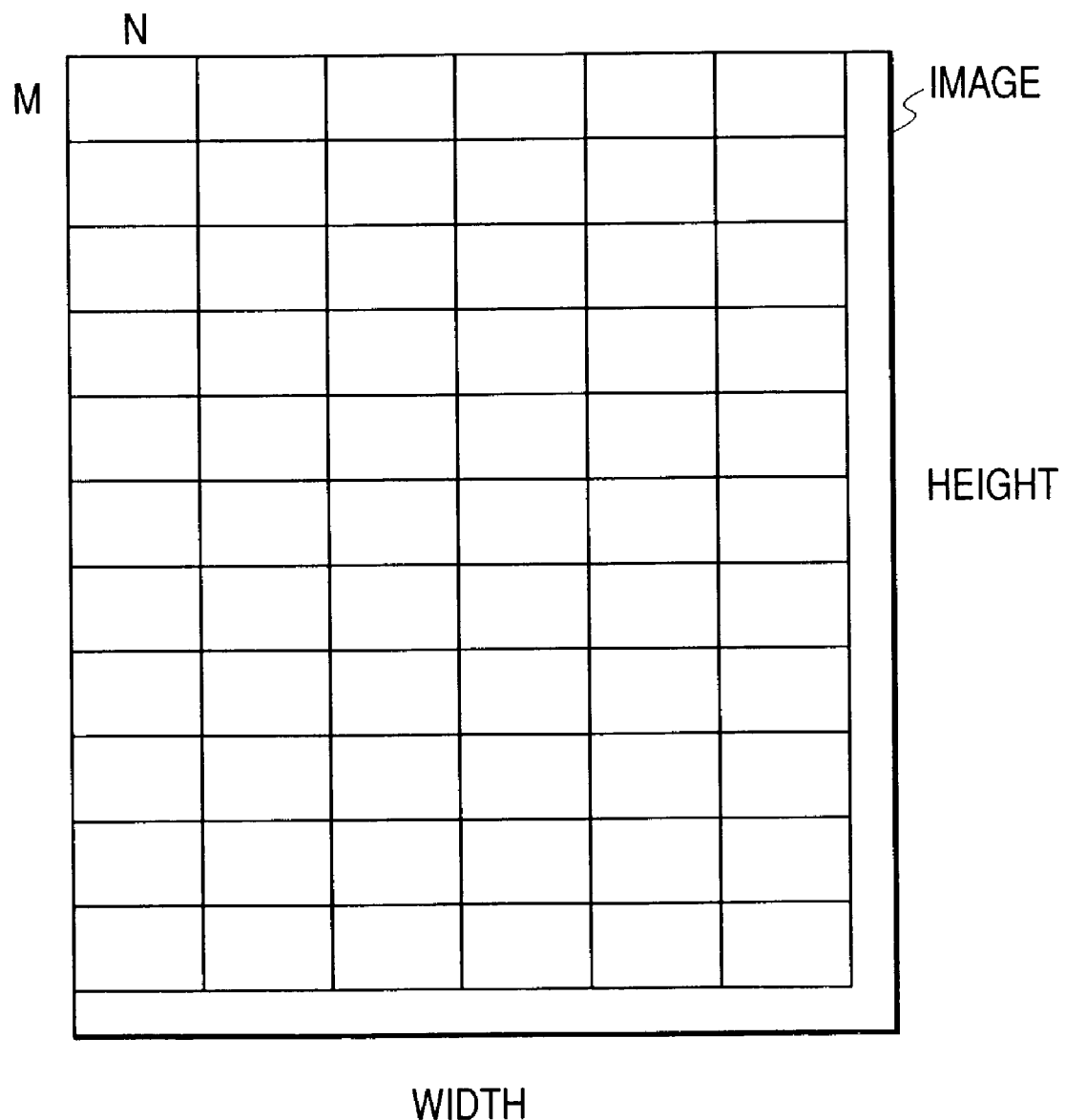
FIG. 5 shows one blocking example.

FIG. 5 shows one image including a horizontal pixel number WIDTH and vertical pixel number HEIGHT. It is now assumed that the addition information is multiplexed in the image. A left upper point of the image is assumed as an origin, and the blocking is performed with horizontal N pixels and vertical M pixels. In the present embodiment, the origin is a reference point in performing the blocking, and a point apart from the origin may also be set as the reference point. When maximum information is multiplexed in the image, N×M blocks are arranged from the reference point. That is, the number of blocks which can be arranged in the horizontal direction is W, and the number of blocks which can be arranged in the vertical direction is H. On this assumption, the following relation is obtained:

$$W=INT(WIDTH/N) \quad \text{Equation 1; and}$$

$$H=INT(HEIGHT/M) \quad \text{Equation 2,}$$

wherein INT( ) indicates an integer portion within ( ).

An indivisible surplus pixel number in Equations 1 and 2 corresponds to an end of arrangement of a plurality of N×M blocks, and is outside a code multiplexing area.

Figure 4:
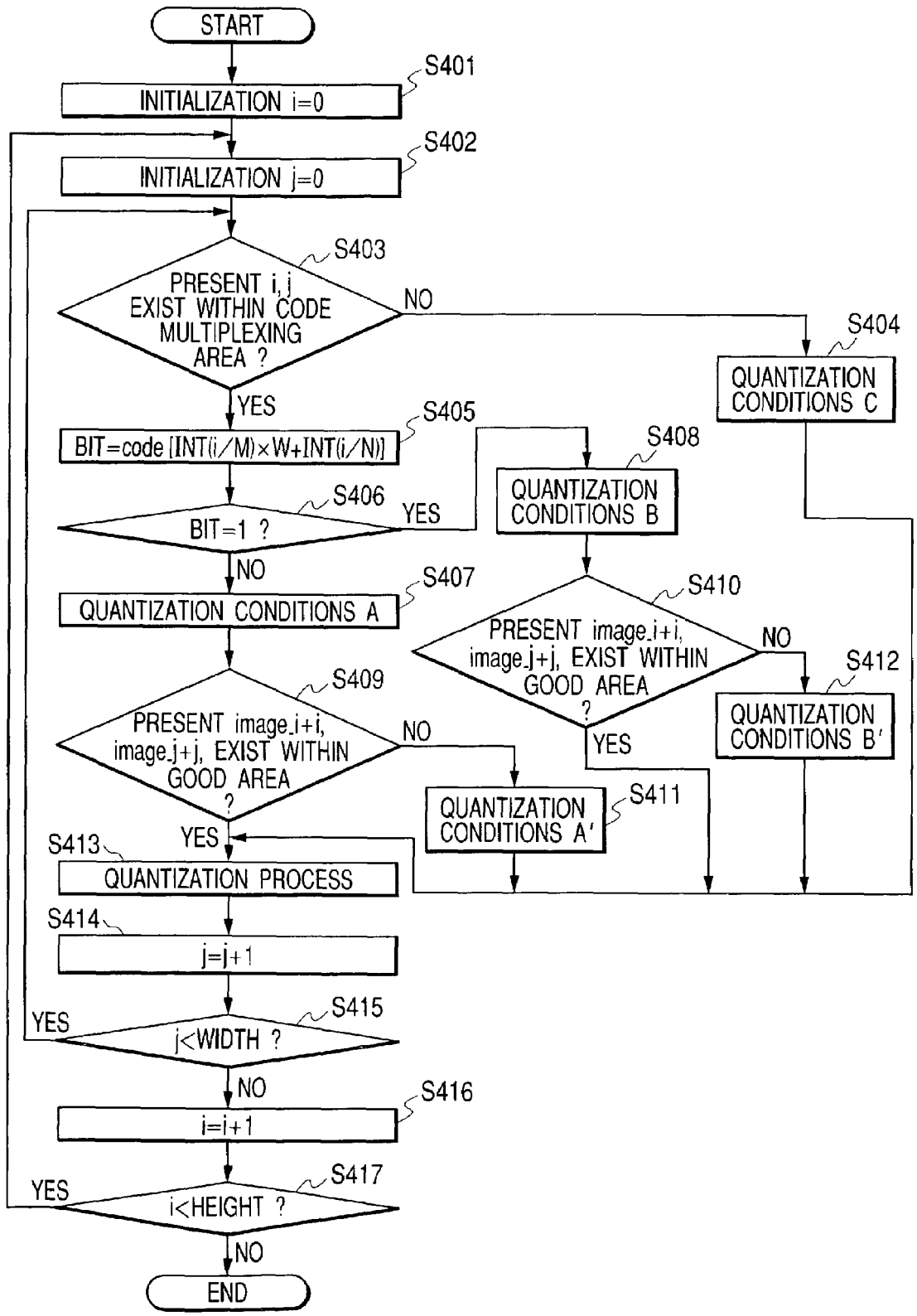
FIG. 4 is a flowchart showing an operation procedure of a multiplexing process including a quantization control unit.

In FIG. 4, it is judged in S403 that a presently processed noted pixel is outside the multiplexing area, and quantization conditions C are set in S404. On the other hand, when the noted pixel is judged to be in the multiplexing area, the addition information to be multiplexed is read. Now to facilitate the description, the addition information is represented for each bit using an arrangement code( ).

In S405, by a variable bit, the information in the arrangement code( ) is assigned as follows.

$$bit=code(INT(i/M) \times W + INT(j/N)) \quad \text{Equation 3}$$

Subsequently, it is judged in S406 whether the assigned variable bit is "1" or not. As described above, since the information in the arrangement code( ) is stored for each bit, the value of the variable bit indicates either "0" or "1".

When the value is judged to be "0" in S406, and a quantization condition A is judged to be "1" in S407, a quantization condition B is set in S408.

Subsequently, in S409, S410, a noted pixel position being processed is evaluated with an absolute coordinate on page, not a relative coordinate from the image origin.

A layout in page will be described with reference to FIG. 6.

Figure 6:
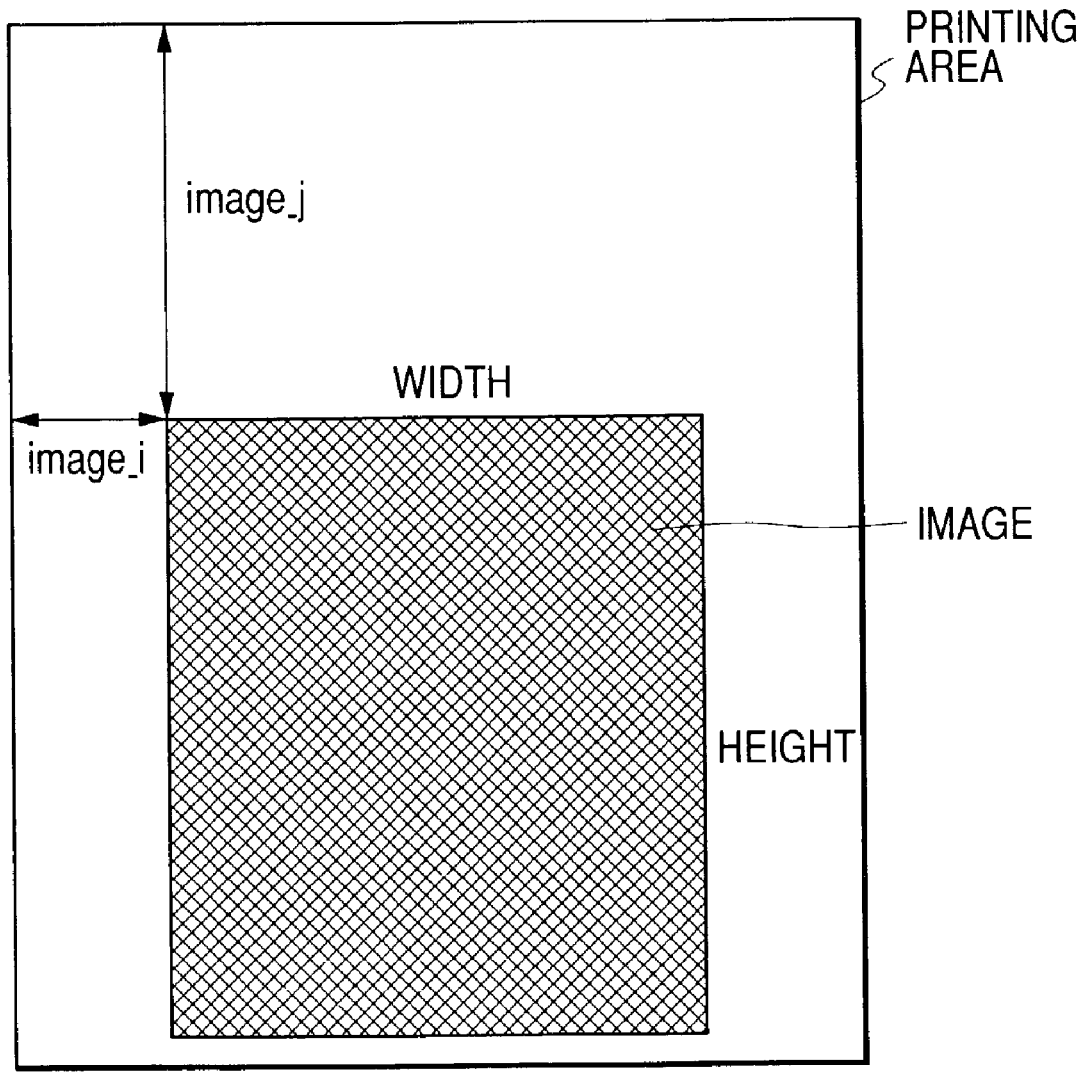
FIG. 6 shows one example of an image layout.

FIG. 6 shows an example of the layout in which the image for use in multiplexing is arranged in an absolute distance from the page origin in a position of (image_j) pixels in the horizontal direction and (image_i) pixels in the vertical direction. In FIG. 6 a hatching portion shows the image.

Figure 7:
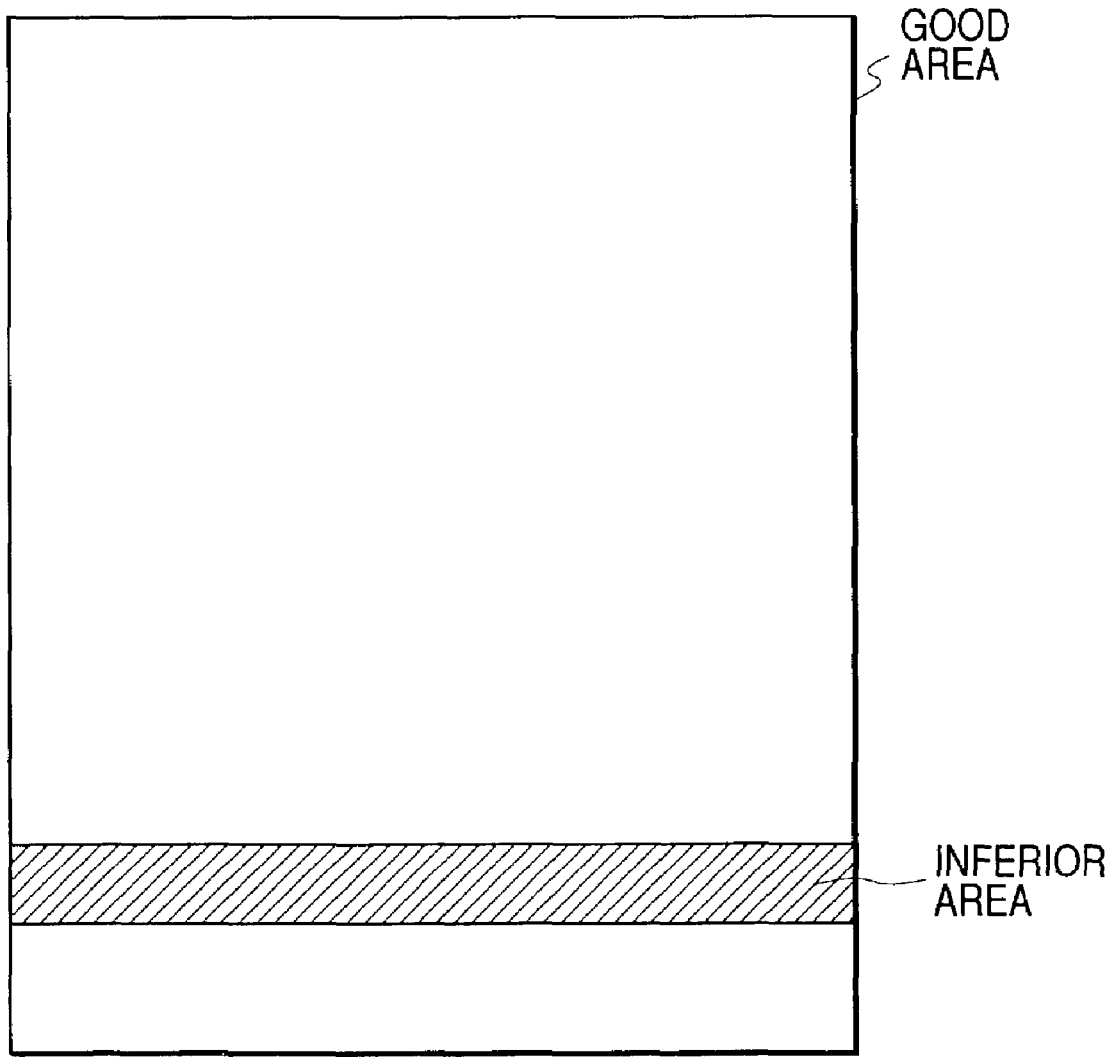
FIG. 7 is an explanatory view of an image deterioration area on a recording sheet.

FIG. 7 shows an example in which paper for one page outputted by the printer is assumed, and classified into two types: including a portion with a good printing; and a portion with an inferior printing. As described above, in a moment in which a recording sheet comes off various rollers during the printing, or in a moment in which the recording sheet rushes into various rollers during the printing, the printing is deteriorated by impact vibration in many cases. This differs dependent on the mechanical constitution peculiar to the printer.

In FIG. 7, a printing area (shaded area) of a time at which the recording sheet is removed from the rollers is assumed to be an inferior area, and another area is assumed to be a good area. Of course, it is preferable to classify the area for each paper size for use. Moreover, area types are not limited to two including the inferior and good areas, and the area may also be classified in more areas in accordance with an image quality level. Since this classification is peculiar to the printer, it is preferable to experimentally obtain classes.

Additionally, in the examples of FIGS. 6, 7, the inferior area is present in the image for use in the multiplexing, and the judgment of presence is performed in S409, S410.

It is judged both in S409, S410 whether an absolute coordinate (image_i+i, image_j+j) on page of the present noted pixel is in the good area or not.

When the coordinate is judged not to be in the good area in S409, in S411 the quantization condition is changed to a quantization condition A' from the quantization condition A. When the coordinate is judged not to be in the good area in S410, in S412 the quantization condition is changed to a quantization condition B' from the quantization condition B.

Next in S413, a quantization process is performed based on the set quantization conditions. This quantization process corresponds to the error diffusion method described in FIG. 3.

Subsequently, a horizontal-direction variable j is counted up in S414, it is judged in S415 whether the variable is less than the image horizontal pixel number WIDTH, and the above-described process is repeated until the process pixel number reaches WIDTH. Moreover, after the end of the process of the horizontal direction for the pixel number WIDTH, the vertical-direction variable i is counted up in S416, it is judged in S417 whether the variable is less than the image vertical pixel number HEIGHT, and the above-described process is repeated until the process pixel number reaches HEIGHT.

By the above-described operation procedure, it is possible to change the quantization condition by the block unit including N×M pixels.

Subsequently, examples of the quantization conditions A, B, C and A', B' will be described. The quantization conditions in the error diffusion method include various factors, and the quantization conditions in the present invention correspond to quantization threshold values. For the use of a quantization condition C, outside the quantization area, any quantization threshold value may be used. As described above, when one pixel is represented in the gradation by eight bits, and a quantization level is binary, the maximum value "255" and minimum value "0" are quantization representative values, and an intermediate value "128" is set as the quantization threshold value in many cases. That is, in the quantization condition C, the quantization threshold value is fixed at "128".

Since the quantization conditions A, B are used for the blocks in the multiplexing area, a difference in the image quality has to be generated because of the difference of the quantization condition. It is to be noted that the difference of the image quality is represented not to be easily visually distinguished, and has to be easily identified from paper.

Figure 8A:
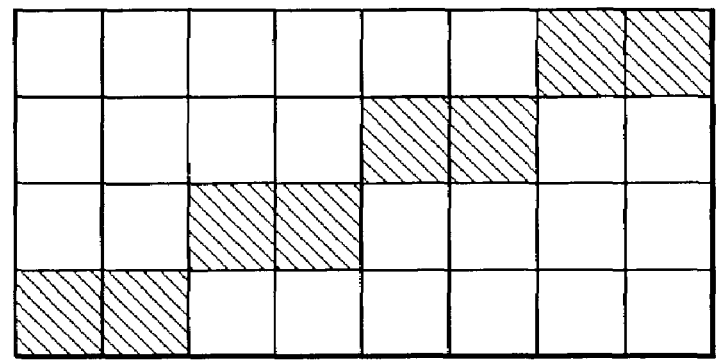
FIGS. 8A and 8B show one example of a quantization threshold value change in quantization conditions.
Figure 8B:
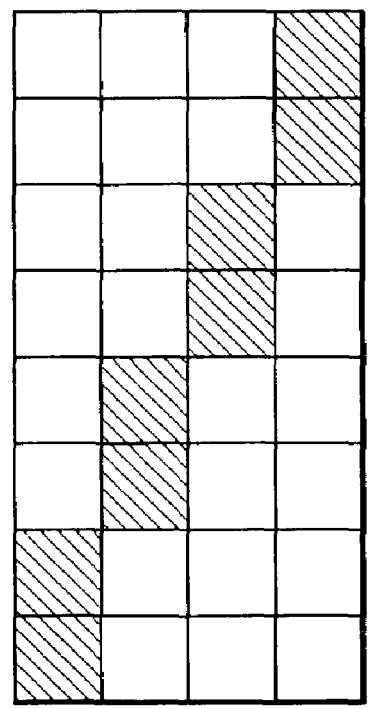

FIGS. 8A and 8B show examples of the quantization conditions A and B. FIG. 8A is a diagram showing a period of change of the quantization threshold value in the quantization condition A. In the drawing, one box is assumed for one pixel, a white box indicates a fixed threshold value, and a gray box indicates a variable threshold value. That is, in the example of FIG. 8A, a matrix of eight horizontal pixels and four vertical pixels is set, and a protruding value of only the threshold values of the gray boxes is set as the threshold value.

FIG. 8B is similarly a diagram showing a period of change of the quantization threshold value in the quantization condition B. In the example of FIG. 8B, different from FIG. 8A, a matrix of four horizontal pixels and eight vertical pixels is set, and the protruding value of only the threshold values of the gray boxes is set as the threshold value.

Now assuming that one pixel indicates a gradation value of eight bits as described above, as one example, the fixed threshold value is set to "128", and the protruding threshold value is set to "48". When the quantization threshold value drops, the quantization value of the noted pixel easily turns to "1" (quantization representative value "255"). That is, both in FIGS. 8A and 8B, the quantization value "1" is easily generated in the arrangement of gray boxes. In other words, for each block of N×M pixels, the block in which the dot is generated in the arrangement of gray boxes of FIG. 8A, and the block in which the dot is generated in the arrangement of gray boxes of FIG. 8B are present in a mixed manner. Naturally, in the same block of the N×M pixels, the matrix of FIG. 8A or 8B is repeated.

Some change of the quantization threshold value in the error diffusion method does not exert a large influence in the image quality. In the organized dither method, the image quality of the gradation representation largely influences in accordance with a dither pattern for use. However, as described above, for the error diffusion method in which the change of the quantization threshold value is regularly given, the gradation representation to determine the image quality absolutely corresponds to the error diffusion method. Therefore, the arrangement of dots somewhat changes, the generation of texture changes, and the image quality of the gradation representation is hardly influenced. Therefore, even when the quantization threshold value changes, the error as a difference between signal and quantization values is diffused in the peripheral pixel, and the inputted signal value is stored in a macro manner. That is, redundancy becomes very large with respect to the arrangement of dots and the generation of texture in the error diffusion method.

Moreover, in the above-described example, when the value of the variable bit is "0", the condition is simply changed to the quantization condition A. With "1", the condition is changed to the quantization condition B. However, the present invention is not limited to this. It is also possible to represent the variable bit by the combination of the quantization conditions. For example, as shown in FIGS. 9A and 9B, the block of N×M pixels is further divided into four small blocks. When the value of the variable bit is "0", the arrangement of FIG. 9A is used. With "1", the arrangement of FIG. 9A is used to perform the quantization so that a difference can also be made.

Additionally, the quantization conditions A', B' have the same change period of the quantization condition as that of the quantization conditions A and B. Moreover, a place where the quantization conditions A' and B' are used is an area where the image quality is deteriorated by the mechanical noise of the printer. Therefore, the multiplexing needs to be strengthened. To solve the problem, to strengthen the multiplexing, in the present embodiment, an amplitude to modulate the threshold value is set to be large. For example, in the modulation of the quantization threshold values on the quantization conditions A and B, the usual threshold value "128" is changed to "48". However, on the quantization conditions A' and B', the usual threshold value "128" is changed to "16". Naturally, a probability at which the desired dot is generated increases, and the separation process is facilitated, but the image quality by the multiplexing process is deteriorated. Additionally, originally in the inferior area, since the mechanical noise is generated, the image quality is disturbed. Therefore, even when secure multiplexing is executed, there is hardly visual influence.

The addition information separating device 106 will next be described.

FIG. 10 is a block diagram showing a constitution of the addition information separating device 106.

Reference numeral 1000 denotes an input terminal, and the image information read by the scanner is inputted. A resolution of the scanner for use is preferably equal to or more than a printer resolution in preparing the printed matter. Naturally, to accurately read scattered information of the dots of the printed matter, by a sampling theorem, the resolution twice or more times the resolution on the printer side is required on the scanner. side. However, with the equal or more resolution, if not accurate, it is possible to distinguish the dots scattered to some degree. In the present embodiment, to facilitate the description, it is assumed that the printer resolution is the same as the scanner resolution.

Reference numeral 1001 denotes a geometric correction unit that corrects rotation and expansion/contraction of the printed matter read by the scanner. Various known methods are considered with respect to the geometric correction unit 1001.

Reference numeral 1002 denotes a blocking unit that forms a block by a P×Q pixel unit. This block has to be smaller than the block of N×M pixels during the multiplexing. That is, the following relation is established.

$$P \leq N, \text{ and } Q \leq M \qquad \text{Equation 4}$$

Moreover, when the block is formed by the P×Q pixel unit, the blocking is skipped every given interval.

That is, in an area assumed as the block including N×M pixels in the multiplexing, the blocking is performed so that one block is included by the P×Q pixel unit. For a skip pixel number, N horizontal pixels and M vertical pixels are basic.

Reference numerals 1003 and 1004 denote spatial filters A and B respectively, which have different characteristics, and 1005 denotes a digital filtering unit which calculates a sum of products with the peripheral pixels. Each coefficient of the spatial filter is adapted and prepared for the period of the variable threshold value of the quantization condition of the multiplexing time.

It is now assumed that for the change of the quantization condition in the addition information multiplexing device 103, two periodicities of FIGS. 8A and 8B are used to multiplex the addition information. Examples of the spatial filter A 1003 and spatial filter B 1004 for use in the separating device are shown in FIGS. 11A and 11B. In the drawings, the center portion of 5×5 pixels is the noted pixel, and other 24 pixels are peripheral pixels. In the drawing, the pixel of a blank portion indicates that a filter coefficient is "0". As apparent from the drawing, FIGS. 11A and 11B show the filters with emphasized edges. Additionally, the directionality of the emphasized edge agrees with the directionality of the variable threshold value of the multiplexing time. That is, FIG. 11A is prepared to agree with FIG. 8A, and FIG. 11B is prepared to agree with FIG. 8B.

Reference numeral 1006 denotes a characteristic amount detecting unit which detects some characteristic amount based on filtered converted values from the filtering unit 1005 by the spatial filter A 1003 and spatial filter B 1004. The following examples of the detected characteristic amounts are considered.

1. Maximum value of the converted value in the block after the digital filter
2. Difference of maximum and minimum values of the converted value in the block after the digital filter
3. Scattered value of the converted value in the block after the digital filter In the present embodiment, the scattered value described in the above 3 is used as the characteristic amount.

Reference numeral 1007 denotes a judgment unit that compares the sizes of scattered values and judges the larger scattered value as a code. That is, when the scattered value of the filtering by the spatial filter A is large, the quantization on the quantization condition A during the printing is presumed. Conversely, when the scattered value of the filtering by the spatial filter B is large, the quantization on the quantization condition B during the printing is presumed. The quantization condition correlates with the code (bit of Equation 3) of the addition information, and the identification of the quantization condition therefore indicates that the multiplexed code can be specified. That is, when the quantization condition A is presumed, bit=0 can be judged. When the quantization condition B is presumed, bit=1 can be judged.

The example has been described above in which the multiplexing method in consideration of the characteristics of local image quality deterioration of the printer is realized by adjusting the strength of the multiplexing. A degree of the strength can also be considered other than the amplitude for modulating the quantization threshold value. For example, with a color image, there is a method of changing an ink color for use in the multiplexing. That is, a method of using the ink color resistant to the noise to multiplex the "inferior area".

As described above, according to the first embodiment, the area having an inferior printing as a printing area in the moment when the recording medium comes off the various rollers or the recording medium rushes into various rollers, and other printing areas having a satisfactory printing are judged based on the absolute coordinate on page, not the relative coordinate from the image origin. For the area where the printing is inferior, an embedding method of the information is used considering that ease of extraction is more important than the image quality. In the area where the printing is satisfactory, the embedding method of the information is used considering that the image quality is more important than the ease of extraction. Thereby, extraction precision in the extraction time of the embedded information, optimization of the extraction time, and optimum design of the image quality can be realized.

Second Embodiment

Figure 12:
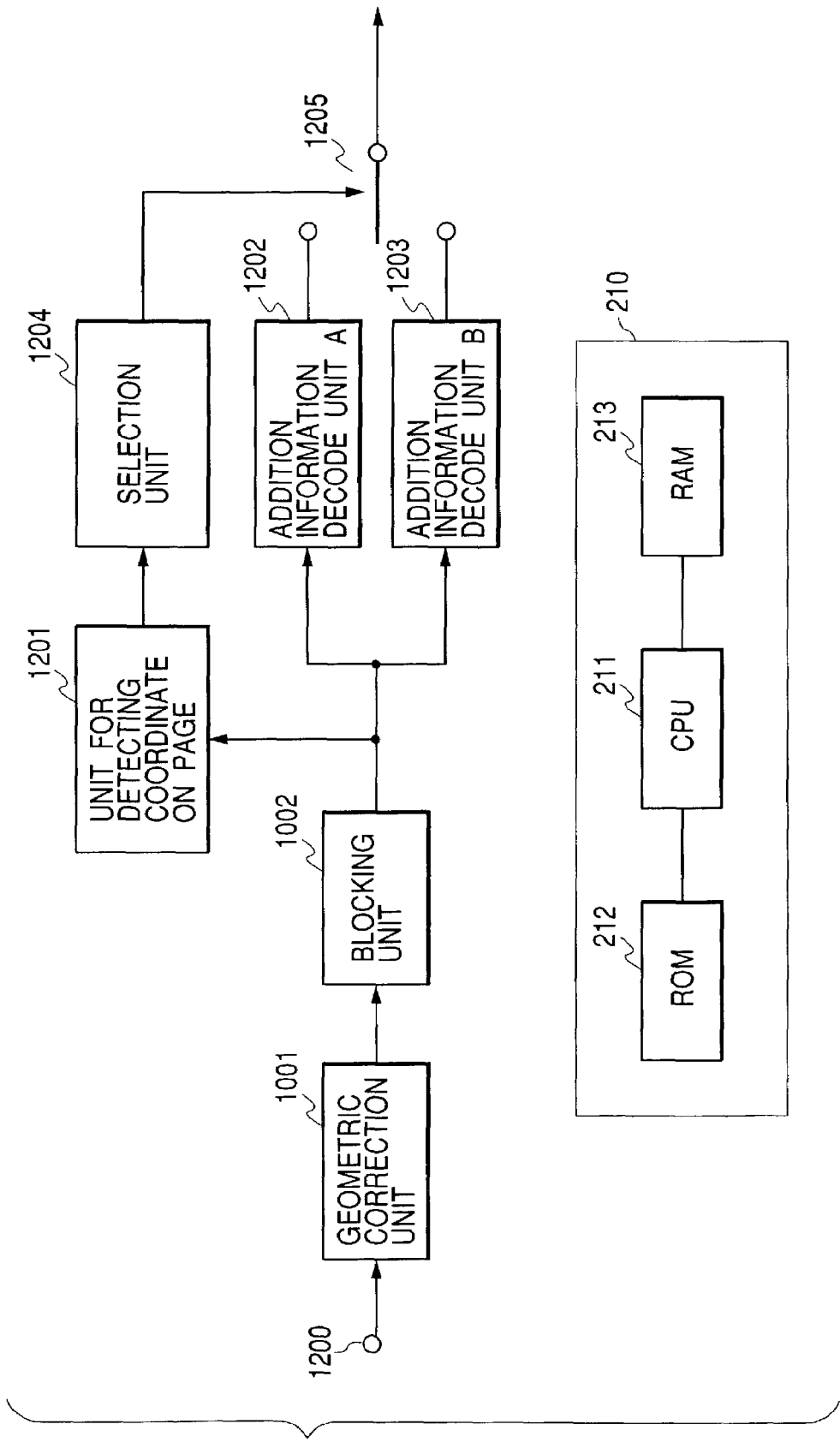
FIG. 12 is a major part block diagram showing the constitution of the addition information separating device in a second embodiment.

FIG. 12 shows a constitution of the image processing system of a second embodiment. In the present embodiment, in the constitution shown in FIG. 1, a decode (extraction) method is changed in accordance with the absolute coordinate on page.

In the present embodiment, since the addition information multiplexing device is assumed by the flowchart of FIG. 4, a minimum unit to change the decode method is a block unit.

In FIG. 12, reference numeral 1200 denotes an input terminal, and the image information for one page read by the scanner is inputted via the terminal. Reference numeral 1001 denotes a geometric correction unit which corrects the rotation and expansion/contraction of the printed matter read by the scanner. Reference numeral 1002 denotes a blocking unit that forms a block by the P×Q pixel unit.

Reference numeral 1201 denotes a unit for detecting coordinate on page, which counts the coordinate for one page with the proceeding of a decode process, and acquires coordinate information on page being processed.

Reference numerals 1202, 1203 denote addition information decode units A, B, and include two types of decode units.

Reference numeral 1204 denotes a selection unit that selects the following via a switch 1205 in accordance with the coordinate on page.

Figure 13:
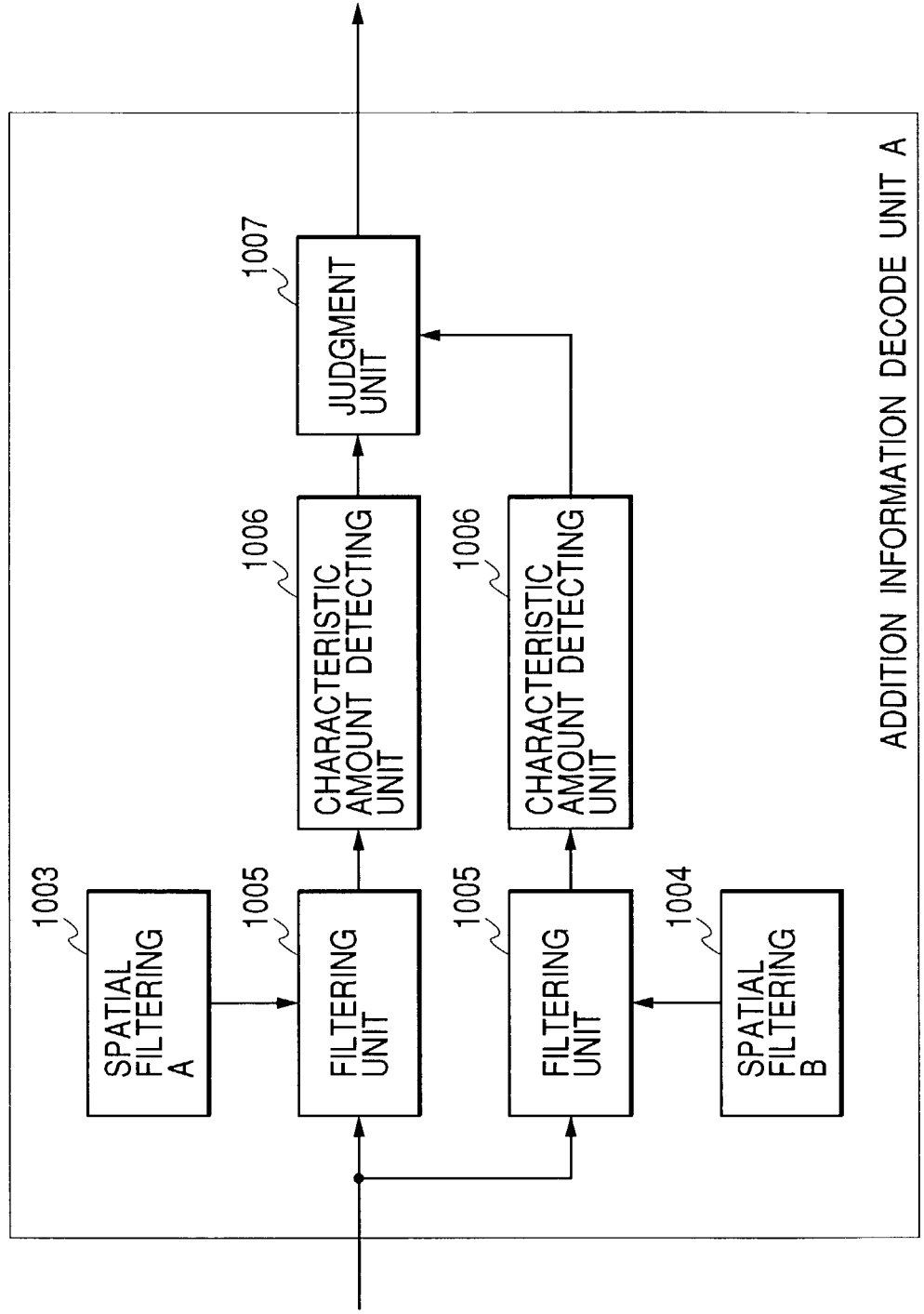
FIG. 13 is a block diagram of an addition information decode unit A of FIG. 12.

1) Select the addition information decode unit A, when the process block is the good area
2) Select the addition information decode unit B, when the process block is the inferior area The addition information decode unit A is shown in FIG. 13. A block surrounded by a chain line shows the addition information decode unit A. Since the addition information decode unit A performs the same process in the block as that of the method shown in FIG. 10, the description thereof is omitted.

Figure 14:
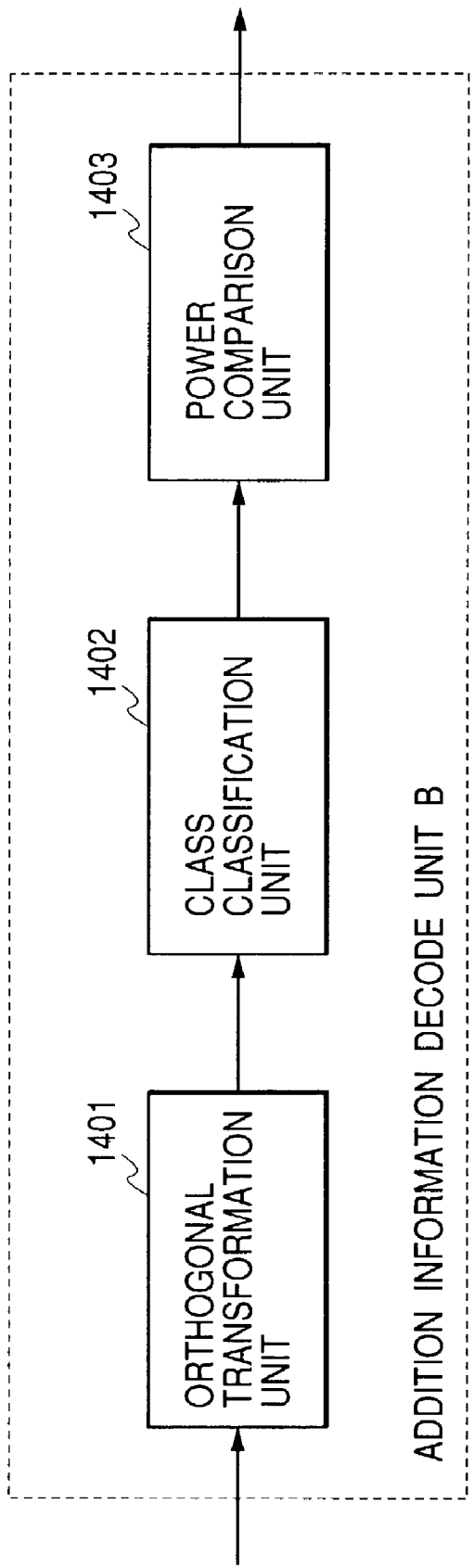
FIG. 14 is a block diagram of an addition information decode unit B of FIG. 12.

FIG. 14 is a block diagram of the addition information decode unit B. Similarly, the block surrounded by the chain line shows the addition information decode unit B.

In the drawing, reference numeral 1401 denotes an orthogonal transformation unit that orthogonally transforms the blocked P×Q pixels. Additionally, when two-dimensional orthogonal transformation is performed, it is necessary to for a square block with Q=P.

In the present embodiment, discrete cosine transformation (DCT) will be described as an example.

A transformation coefficient of the two-dimensional DCT of the block including P×P pixels is as follows:

$$F(u, v) = (2/P)C(u)C(v)\sum_{n=0}^{P-1}\sum_{m=0}^{P-1} f(n, m)\cos((2n+1)u\pi/2P)\cos((2m+1)v\pi/2P),$$

wherein $C(x)=1/\sqrt{2}(x=0)$; and $C(x)=1 (x 1 6 0)$    Equation 5

Reference numeral 1402 denotes a class classification unit that classifies the class for each band of the orthogonal transformation coefficient.

Figure 15:
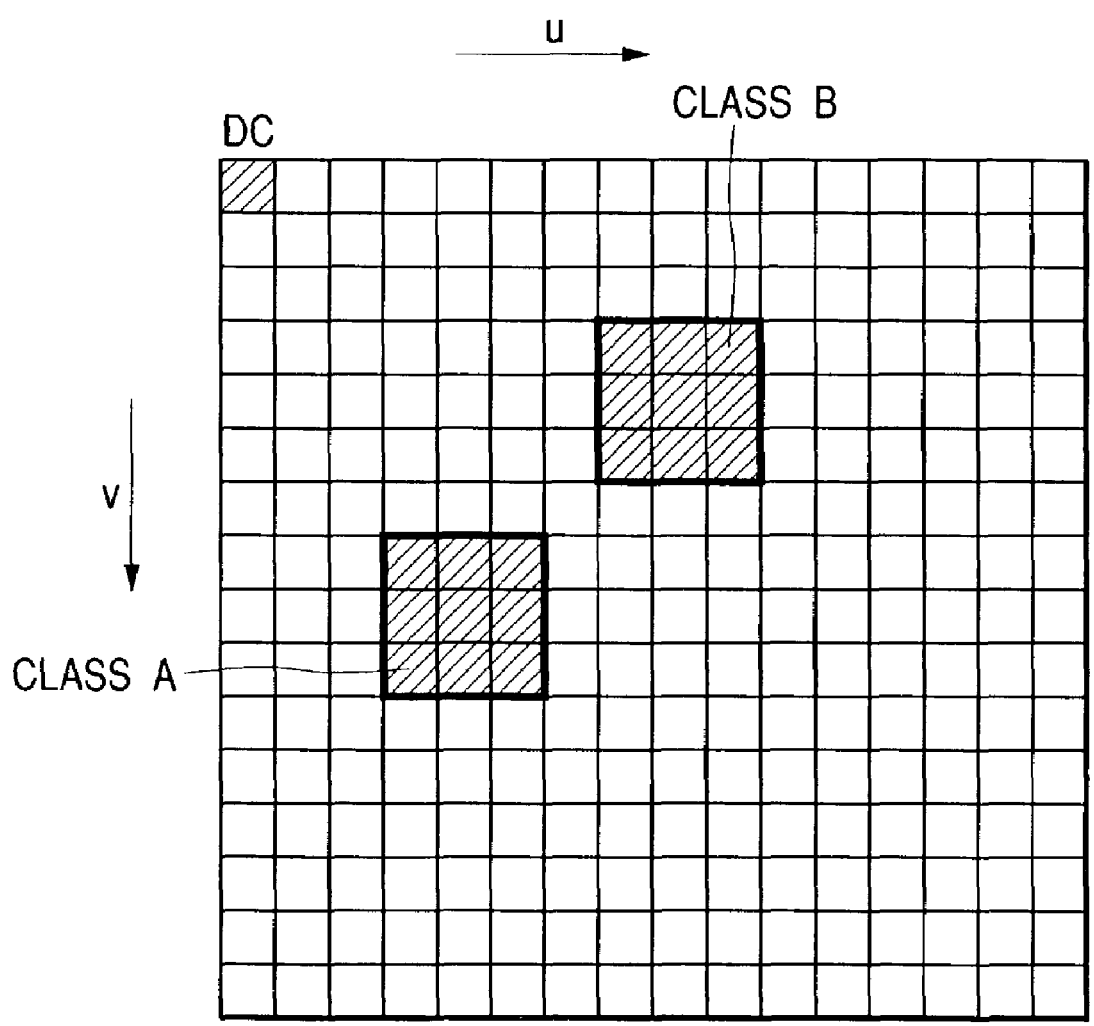
FIG. 15 is an explanatory view of classification in a two-dimensional frequency area.

FIG. 15 shows one example of the class classification with P=Q=16. In FIG. 15, an orthogonal transformation coefficient F(u,v) in one block is shown, a left upper part shows DC components, and the remaining 255 components correspond to AC components. Now two classes including a class A centering on F(4,8) and class B centering on F(8,4) are prepared. In the drawing, two classes are shown by bold lines. This class classification unit does not have to classify all 256 components into classes, and may form a plurality of classes centering on desired components. The number of required classes corresponds to the number of conditions on which the quantization is controlled during the multiplexing. That is, the class number is not more than the condition number in the quantization control.

Reference numeral 1403 denotes a power comparison unit that compares total sums of powers of the respective classes. To increase an operation rate, the absolute value of the generated transformation coefficient may be used as a substitute for power. The total sums of power of the respective classes are compared with one another, and the signal of the addition information is judged.

An example in which the quantization conditions A and B of FIGS. 8A and 8B are applied during the multiplexing will now be described. As described above, in the quantization using the quantization conditions A and B, textures in which the dots are arranged in oblique directions having different angles are easily generated. That is, when the orthogonal transformation process is performed in the quantized block on the quantization condition A, a large power is generated in the class A of FIG. 15.

On the other hand, when the orthogonal transformation process is performed in the quantized block on the quantization condition B, the large power is generated in the class B of FIG. 15. That is, in relative comparison of the size relation of the powers of the classes A and B, it can be judged whether the quantization condition in multiplexing the corresponding block is the quantization condition A or B.

The quantization condition correlates with the code (bit of Equation 3) of the addition information, and the identification of the quantization condition therefore indicates that the multiplexed code can be specified. In the example of the flowchart shown in FIG. 4, bit=0 is set to the quantization condition A, and bit=1 is set to the quantization condition B. Therefore, when the power of the class A is larger, bit=0 can be judged. When the power of the class B is larger, bit=1 can be judged.

Two types of decode units have been described above. The changing of the decode unit of the present embodiment is necessary for optimum designs of a decode detection ratio and decode time. That is, with respect to the satisfactory printing area, it is judged that the decoding is easy, and the decode unit A fast in a decode (extraction) time is used in the decoding. On the other hand, with respect to the printing area where the noise components are superimposed, priority is given to the decode detection ratio rather than to the decode (extraction) time, and the decode method with a higher precision is used.

When the absolute coordinate of the recorded printed matter is used as the evaluation factor in this manner, a printing quality level can be estimated, and the optimum decode unit can be selected.

In the present embodiment, two types of decode units A and B have been described, but more units may naturally be used.

Moreover, the decode units are not limited to these.

Furthermore, a method of using the same decode unit and changing only a detection precision of the unit can also be considered. That is, in the decode unit in which more precision is demanded, a high-redundancy decoding by repletion is effective. For example, a method using the orthogonal transformation by the P×Q pixels (decode unit B) is considered, comprising: allowing the block of P×Q pixels to deviate in space by several pixels; performing a plurality of orthogonal transformations; and enhancing the precision of judgment through a plurality of class comparisons. In this case, physical characteristics of the recording medium are empirically ranked and set as the evaluation factors, and the number of repetitions is controlled to gradually increase in accordance with the rank. This is also an effective method.

With the judgment using a plurality of orthogonal transformations, the decode precision is naturally enhanced, but a process time is unnecessarily required. The optimization is preferably empirically designed.

Moreover, in the present embodiment, the multiplexing by the flowchart of FIG. 4 is an assumption. Therefore, during the multiplexing and decoding, the printing area with a deteriorated image quality is subjected to the secure multiplexing and high-precision decoding. However, a method of performing a uniform multiplexing without any distinction during the multiplexing, and changing the precision only during the decoding is also naturally effective.

Furthermore, to change both the multiplexing and decoding methods based on the absolute coordinate on paper, the changing or setting of the block size having a periodicity of modulation of the quantization threshold value to be small in the good area and to be large in the inferior area is also considered.

Additionally, factors other than the impact vibration in a time when the inferior area rushes in the roller or comes off the roller are also considered. For example, in the mechanical constitution in which the whole surface printing is realized without any margin in paper, the precision of a paper end is deteriorated, and there is a high possibility that the area turns to the inferior area.

The changeover of the decoding and multiplexing methods has been described above, but the multiplexing method and the separating method of the addition information are not limited to the above-described methods. In any multiplexing or separating method, a constitution for controlling the separating and multiplexing methods based on the absolute coordinate on paper is effective.

As described above, according to the second embodiment, the area having the inferior printing as the printing area in the moment when the recording medium comes off the various rollers or the recording medium rushes into various rollers, and other printing areas having the satisfactory printing are judged based on the absolute coordinate on page, not the relative coordinate from the image origin. For the area where the printing is inferior, an extraction method of the information is used considering that extraction precision is more important than the extraction time. In the area where the printing is satisfactory, the extraction method of the information is used considering that the extraction time is more important than the extraction precision. Thereby, the extraction precision in the extraction time of the embedded information, optimization of the extraction time, and optimum design of the image quality can be realized. 71428

Third Embodiment

Figure 16:
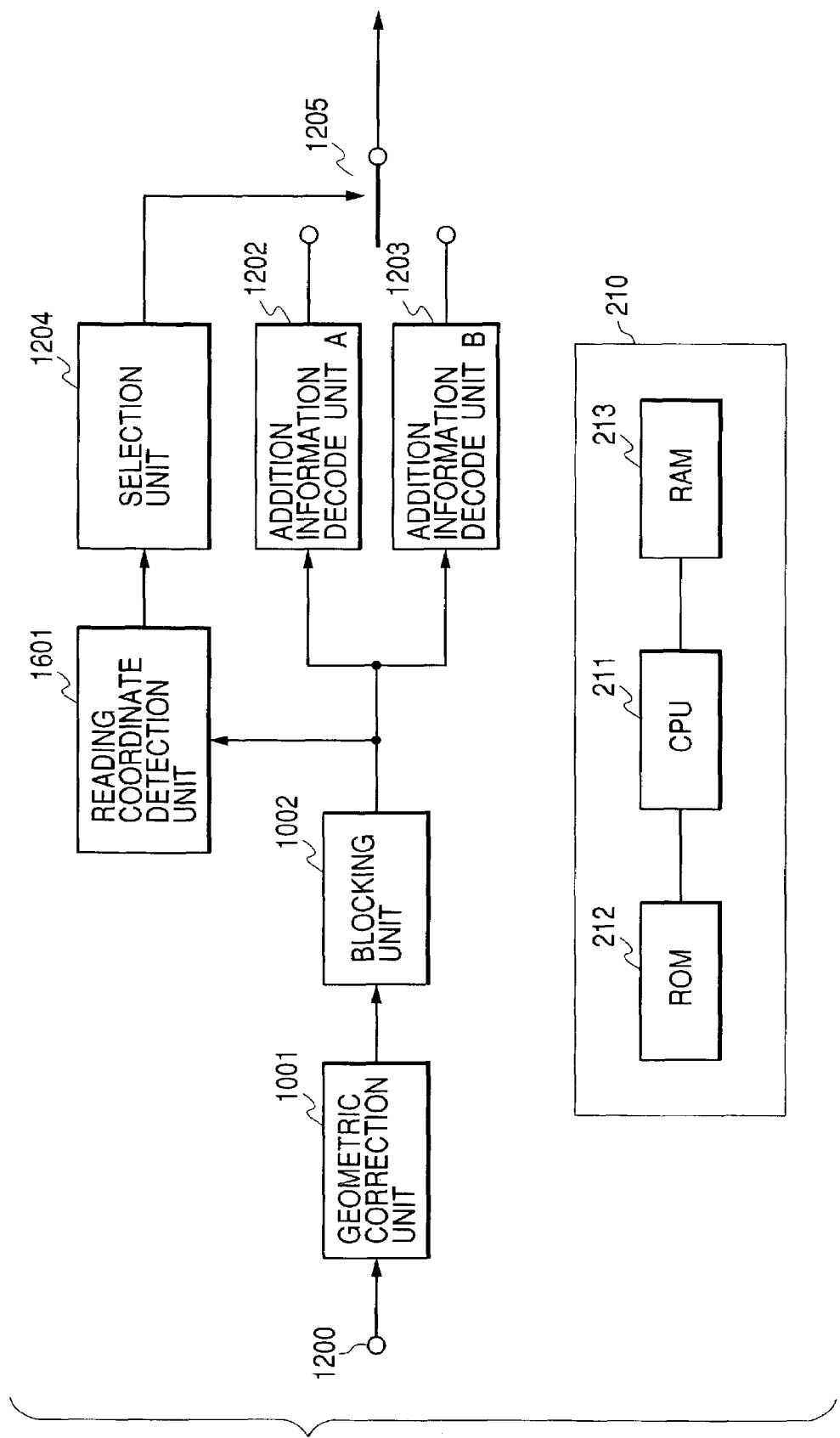
FIG. 16 is a major part block diagram showing the constitution of the addition information separating device in a third embodiment.

FIG. 16 shows a constitution of the image processing system of a third embodiment. In the constitution of the image processing system of the second embodiment shown in FIG. 12, the absolute coordinate of the printed matter is the evaluation factor. In the present embodiment, the decode method is changed in accordance with the absolute coordinate of a draft base in reading the image with the scanner.

In the drawing, the same part as that of FIG. 12 is denoted with the same reference numbers and described.

In the present embodiment, since the multiplexing unit is assumed by the flowchart of FIG. 4, the minimum unit to change the decode method is a block unit.

In FIG. 16, reference numeral 1200 denotes an input terminal, and the image information for one page read by the scanner is inputted via the terminal.

Reference numeral 1001 denotes a geometric correction unit that corrects the rotation and expansion/contraction of the printed matter read by the scanner.

Reference numeral 1002 denotes a blocking unit that forms a block by the P×Q pixel unit.

Reference numeral 1601 denotes a reading coordinate detection unit that detects the position of the block being processed read as the image information on a draft base of the scanner.

Reference numerals 1202, 1203 denote addition information decode units A, B, and include two types of decode units.

Reference numeral 1204 denotes a selection unit that selects the following via the switch 1205 in accordance with the coordinate on page.

Select the addition information decode unit A, when the process block is the good area.

Select the addition information decode unit B, when the process block is the inferior area.

The addition information decode units A and B are similar to those shown in FIGS. 13, and 14, and the description thereof is therefore omitted.

Figure 17:
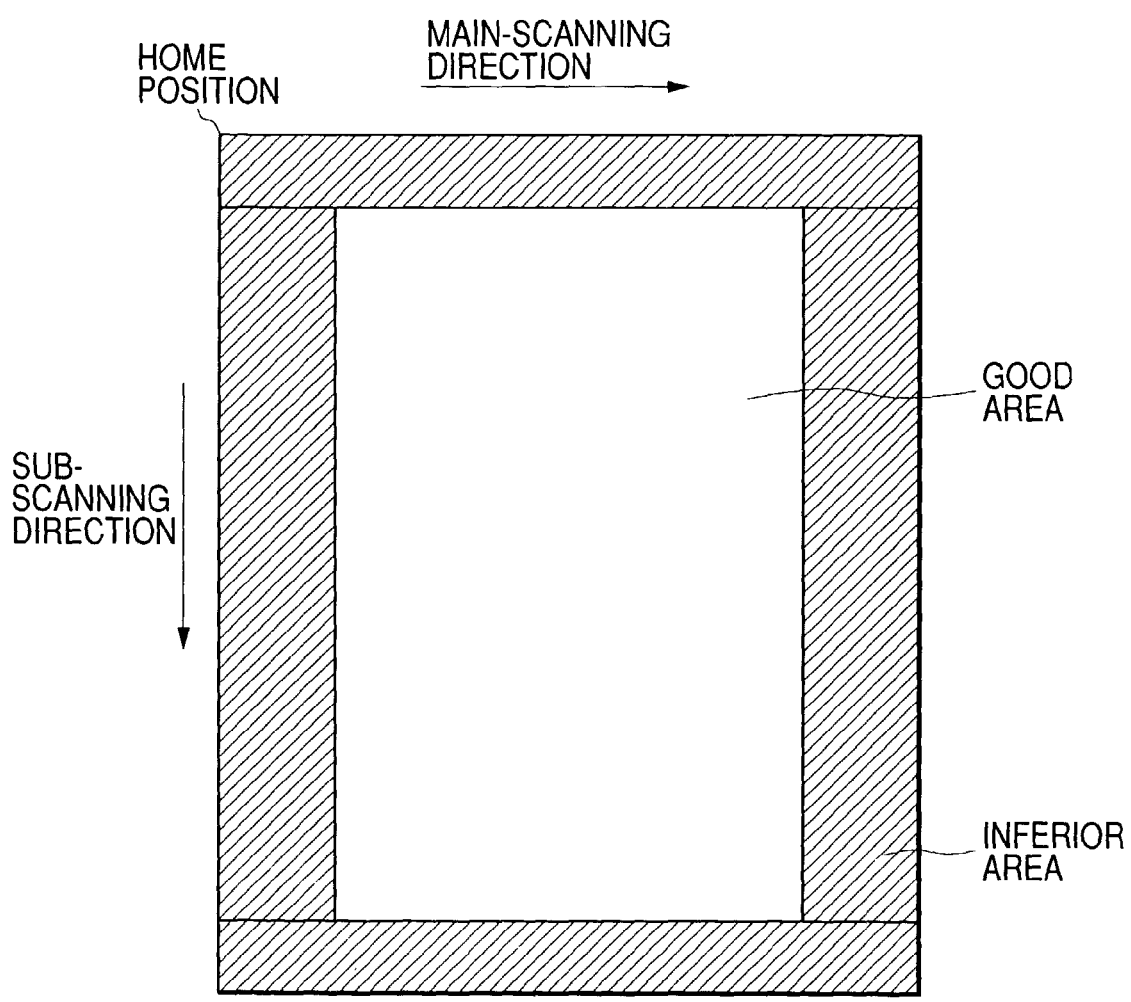
FIG. 17 is an explanatory view of an image deterioration area on a draft base.
Figure 20:
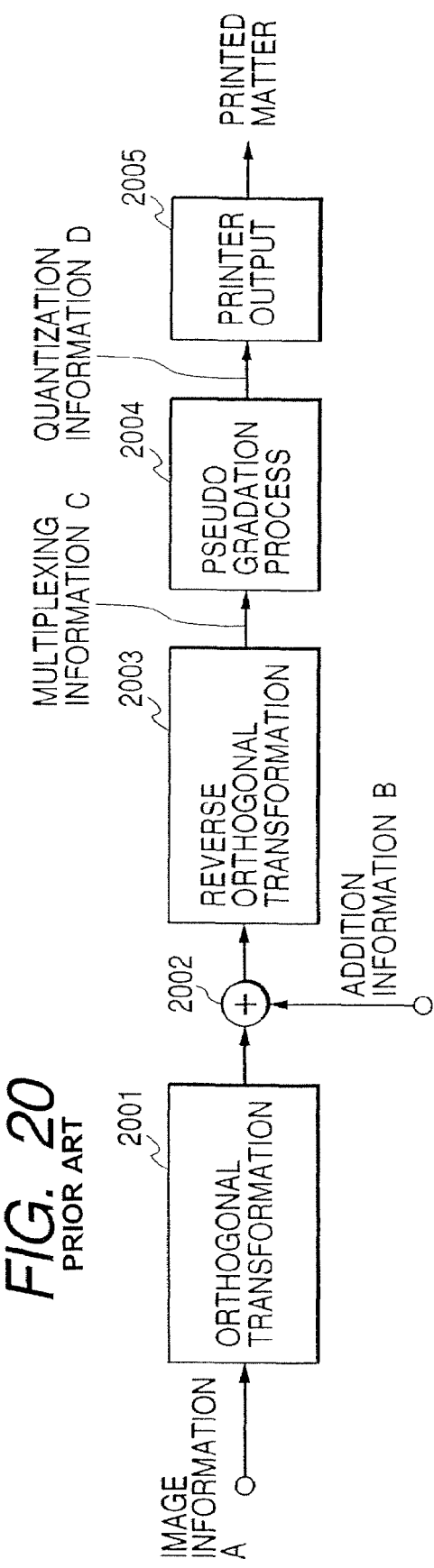
FIG. 20 is a block diagram showing one example of multiplexing of the conventional method.
Figure 21:
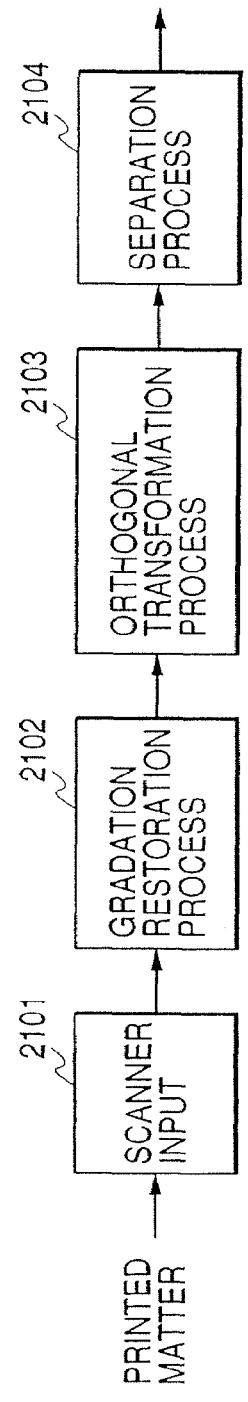
FIG. 21 is a block diagram showing one example of the conventional method.

FIG. 17 shows the examples of good and inferior areas of the scanner draft base.

The scanner carries out a typical method of moving a scanning optical system including a light source unit and optical mirror under the draft base, and forming the image on a line sensor including a light receiving device such as CCD to input the image information.

In FIG. 17, it is assumed that the left upper portion is a home position, the horizontal direction is a main scanning direction in which the line sensors are arranged, and the vertical direction is a sub scanning direction in which the scanning optical system moves. In the main scanning direction, the middle portion has a larger light quantity and higher mechanical precision by an attachment precision than those of the middle portion. Moreover, in the sub scanning direction, because of stability of a driving system such as a stepping motor, the precision of the middle portion is also higher than that of the end. Therefore, it is assumed in FIG. 17 that predetermined upper/lower and left/right areas are inferior areas and other middle portions are good areas. It is natural that the area of the block read by the reading coordinate detection unit 1601 on the draft base can be judged. Therefore, the optimum decode unit can be selected in accordance with the reading precision of the scanner.

An example in which the decode precision is changed dependent on the absolute coordinate by a reading system has been described above. The area division of FIG. 17 is one example, and it is preferable to experimentally obtain the characteristics in accordance with the scanner. It is natural that the degree of the reading precision may be obtained in a stepwise manner and the decode precision may be changed in accordance with the reading precision instead of classifying two types of areas.

Moreover, the scanner in which a draft is fixed has been described above, but it is possible to experimentally obtain the precision characteristics of the absolute coordinate and divide the area even in a movable draft type scanner and facsimile device.

The example in which the embedding or extracting method is changed based on the spatial coordinate on the recording medium or reading device has been described above, but standards of judgment for the changeover other than good/inferior characteristics of the precision of the recording and reading devices can be considered.

For example, in the addition information separating device of FIG. 10, after the geometric correction unit 1001 corrects the rotation and expansion/contraction of the read image, the blocking unit 1002 cuts out the block unit. However, if the influences of the rotation and expansion/contraction are large, they cannot be corrected and the specifying of the block to cut out sometimes fails. In the geometric correction, the image is corrected using the image end as the reference in many cases. Much error is accumulated and the block cutout position deviates in the image center portion rather than the image end. When the risk is presumed, the area disposed apart from the image end is assumed as the inferior area, and it is also possible to set the embedding or extracting method to be secure. That is, the embedding or extracting method is changed in accordance with the relative coordinate from the end of one image, not the absolute coordinate of the recording medium and reading device. When the image size increases, the image center portion has a large deformation. Therefore, this method is effective.

As described above, according to the third embodiment, the embedding or extracting method is changed based on the absolute coordinate by the reading system, and thereby the extraction precision in the extraction time of the embedding information, optimization of the extraction time, and optimum design of the image quality can be realized.

Moreover, the present invention may be applied to the system including a plurality of apparatuses (e.g., a host computer, an interface apparatus, a reader, a printer, and the like), or an apparatus including one device (e.g., a copying machine, a facsimile device, and the like).

Furthermore, needless to say, the object of the present invention may be achieved by a method of supplying a storage medium (or the recording medium) in which a program code of software to realize the functions of the above-described embodiments is recorded to the system or apparatus, and reading and executing the program code stored in the storage medium by the system or apparatus computer (or CPU or MPU). In this case, the program code read from the storage medium realizes the functions of the above-described embodiments, and the storage medium in which the program code is stored constitutes the present invention. Moreover, needless to say, the present invention includes not only a case in which the program code read by the computer is executed and the functions of the above-described embodiments are realized, but also a case in which an operating system (OS) operating on the computer executes a part or the whole of an actual processing based on an instruction of the program code and the functions of the above-described embodiments are realized by the processing.

Furthermore, needless to say, the present invention also includes a case in which the program code read from the storage medium is written in a memory disposed in a function expansion card inserted in the computer or function expansion unit connected to the computer, thereafter the CPU disposed in the function expansion card or unit executes a part or the whole of the actual processing based on the instruction of the program code, and the functions of the above-described embodiments are realized by the processing.

EFFECT OF THE INVENTION

As described above, according to the present invention, an embedding or extracting method is changed based on a spatial coordinate on a recording medium or reading device, and thereby extraction precision in an extraction time of embedding information, optimization of the extraction time, and optimum design of an image quality can be realized.

Moreover, according to the present invention, since the embedding of the addition information into the image information can easily be realized, there can be provided service or application to embed sound information or confidential information into the image information. Furthermore, it is possible to inhibit illegal counterfeiting of paper money, stamp, and securities, and to prevent interference of a copyright of the image information.

What is claimed is:

1. An image processing apparatus comprising:
   input means for inputting an image;
   embedding means for embedding predetermined information to the inputted image by a predetermined embedding method;
   image formation means for forming the image to which the predetermined information is embedded on a recording medium; and
   changeover means for judging an area where printing is satisfactory and an area where the printing is inferior on the recording medium based on a spatial coordinate of the recording medium, and for changing intensity of the embedding by said embedding means in accordance with the area where the printing is satisfactory or the area where the printing is inferior, so that the intensity of the embedding is increased where needed to facilitate extraction of the embedded predetermined information,
   wherein the area where the printing is inferior differs depending on a mechanical construction of the apparatus, and
   wherein said embedding means embeds the predetermined information irrespective of the area where the printing is satisfactory and the area where the printing is inferior.

2. The image processing apparatus according to claim 1 wherein the area where said printing is inferior is a printing area of a time when said recording medium rushes into a roller to convey said recording medium or a printing area of a time when said recording medium comes off the roller.

3. The image processing apparatus according to claim 1 wherein the area where said printing is inferior is an end of said recording medium.

4. The image processing apparatus according to claim 1 wherein said changeover means changes an embedding method in which ease of extracting the predetermined information is regarded as important and an embedding method in which an image quality is regarded as important.

5. An image processing apparatus comprising:
   input means for inputting an image in which predetermined information is embedded from a recording medium;
   extraction means for extracting the predetermined information from the inputted image by a predetermined extraction method; and
   changeover means for judging an area where printing is satisfactory and an area where the printing is inferior on the recording medium based on a spatial coordinate of the recording medium, and for changing intensity of the extraction by said extraction means in accordance with the area where the printing is satisfactory or the area where the printing is inferior, so that intensity of the extraction is increased where needed to facilitate extraction of the embedded predetermined information,
   wherein the area where the printing is inferior differs depending on a mechanical constitution of the apparatus, and
   wherein said extraction means extracts the predetermined information irrespective of the area where the printing is satisfactory and the area where the printing is inferior.

6. The image processing apparatus according to claim 5 wherein the area where said printing is inferior is a printing area of a time when said recording medium rushes into a roller to convey the recording medium or a printing area of a time when said recording medium comes off the roller.

7. The image processing apparatus according to claim 5 wherein the area where said printing is inferior is an end of said recording medium.

8. The image processing apparatus according to claim 5 wherein said changeover means changes an extraction method in which an extraction time is regarded as important and an extraction method in which an extraction precision is regarded as important.

9. An image processing apparatus comprising:
   input means for optically reading a recording medium in which an image to which predetermined information is embedded is formed and inputting the image;
   extraction means for extracting the predetermined information from the inputted image by a predetermined extraction method; and
   changeover means for judging an area where an optical reading precision is satisfactory and area where the precision is inferior based on a spatial coordinate optically read by said input means, and for changing intensity of the extraction by said extraction means in accordance with the area where the precision is satisfactory or the area where the precision is inferior, so that intensity of the extraction is increased where needed to facilitate extraction of the embedded predetermined information,
   wherein the area where the precision is inferior differs depending on a mechanical constitution of the apparatus, and
   wherein said extraction means extracts the predetermined information irrespective of the area where the printing is satisfactory and the area where the printing is inferior.

10. The image processing apparatus according to claim 9 wherein the area where said precision is inferior is an end of a draft base of said input means.

11. The image processing apparatus according to claim 9 wherein said changeover means changes an extraction method in which an extraction time is regarded as important and an extraction method in which an extraction precision is regarded as important.

12. An image processing method comprising:
    an input step of inputting an image;
    an embedding step of embedding predetermined information to the inputted image by a predetermined embedding method;
    an image formation step of forming the image to which the predetermined information is embedded on a recording medium; and
    a changeover step of judging an area where printing is satisfactory and an area where the printing is inferior on the recording medium based on a spatial coordinate of the recording medium, and for changing intensity of the embedding by said embedding step in accordance with the area where the printing is satisfactory or the area where the printing is inferior, so that the intensity of the embedding is increased where needed to facilitate extraction of the embedded predetermined information,
    wherein the area where the printing is inferior differs depending on a mechanical constitution of an apparatus, and wherein said embedding step embeds the predetermined information irrespective of the area where the printing is satisfactory and the area where the printing is inferior.

13. An image processing method comprising:
    an input step of inputting an image in which predetermined information is embedded from a recording medium;
    an extraction step of extracting the predetermined information from the inputted image by a predetermined extraction method; and a changeover step of judging an area where printing is satisfactory and an area where the printing is inferior on the recording medium based on a spatial coordinate of the recording medium, and for changing intensity of the extraction by said extraction step in accordance with the area where the printing is satisfactory or the area where the printing is inferior, so that intensity of the extraction is increased where needed to facilitate extraction of the embedded predetermined information, wherein the area where the printing is inferior differs depending on a mechanical constitution of the apparatus, and wherein said extraction means extracts the predetermined information irrespective of the area where the printing is satisfactory and the area where the printing is inferior.

14. An image processing method comprising:

an input step of optically reading a recording medium in which an image with predetermined information embedded therein is formed and inputting the image;

an extraction step of extracting the predetermined information from the inputted image by a predetermined extraction method; and a changeover step of judging an area where an optical reading precision is satisfactory and an area where the precision is inferior based on a spatial coordinate optically read by said input step, and for changing intensity of the extraction by said extraction step in accordance with the area where the precision is satisfactory or the area where the precision is inferior, so that intensity of the extraction is increased where needed to facilitate extraction of the embedded predetermined information, wherein the area where the precision is inferior differs depending on a mechanical constitution of an apparatus, and wherein said extraction means extracts the predetermined information irrespective of the area where the printing is satisfactory and the area where the printing is inferior.

15. A computer program embodied in a computer-readable medium comprising:

a program code of an input step of inputting an image;

a program code of an embedding step of embedding predetermined information to the inputted image by a predetermined embedding method;

a program code of an image formation step of forming the image to which the predetermined information is embedded on a recording medium; and a program code of a changeover step of judging an area where printing is satisfactory and an area where the printing is inferior on the recording medium based on a spatial coordinate of the recording medium, and for changing intensity of the embedding by said embedding step in accordance with the area where the printing is satisfactory or the area where the printing is inferior, so that the intensity of the embedding is increased where needed to facilitate extraction of the embedded predetermined information, wherein the area where the printing is inferior differs depending on a mechanical constitution of the apparatus, and wherein said embedding step embeds the predetermined information irrespective of the area where the printing is satisfactory and the area where the printing is inferior.

16. An computer program embodied in a computer-readable medium comprising:

a program code of an input step of inputting an image in which predetermined information is embedded from a recording medium;

a program code of an extraction step of extracting said predetermined information from the inputted image by a predetermined extraction method; and a program code of a changeover step of judging an area where printing is satisfactory and an area where the printing is inferior on the recording medium based on a spatial coordinate of the recording medium, and for changing intensity of the extraction by said extraction step in accordance with the area where the printing is satisfactory or the area where the printing is inferior, so that intensity of the extraction is increased where needed to facilitate extraction of the embedded predetermined information, wherein the area where the printing is inferior differs depending on a mechanical constitution of the apparatus, and wherein said extraction means extracts the predetermined information irrespective of the area where the printing is satisfactory and the area where the printing is inferior.

17. A computer program embodied in a computer-readable medium comprising:

a program code of an input step of optically reading a recording medium in which an image with predetermined information embedded therein is formed and inputting the image;

a program code of an extraction step of extracting said predetermined information from the inputted image by a predetermined extraction method; and a program code of a changeover step of judging an area where an optical reading precision is satisfactory and an area where the precision is inferior based on a spatial coordinate optically read by said input step, and for changing intensity of the extraction by said extraction step in accordance with the area where the precision is satisfactory or the area where the precision is inferior, so that intensity of the extraction is increased where needed to facilitate extraction of the embedded predetermined information, wherein the area where the precision is inferior differs depending on a mechanical constitution of the apparatus, and wherein said extraction means extracts the predetermined information irrespective of the area where the printing is satisfactory and the area where the printing is inferior.

18. A computer-readable recording medium wherein the computer program according to claim 15 is stored.

19. A computer-readable recording medium wherein the computer program according to claim 16 is stored.

20. A computer-readable recording medium wherein the computer program according to claim 17 is stored.

* * * * *

UNITED STATES PATENT AND TRADEMARK OFFICE
CERTIFICATE OF CORRECTION

PATENT NO. : 7,408,680 B2
APPLICATION NO. : 10/247519
DATED : August 5, 2008
INVENTOR(S) : Nobutaka Miyake et al.

It is certified that error appears in the above-identified patent and that said Letters Patent is hereby corrected as shown below:

Col. 4, line 15, "flied" should read --ejected--.

line 16, "flied" should read --ejected--.

Col. 14, line 28, "to" should read --to provide--.

line 45, "$C(x) = 1(x16\ 0)$    Equation 5" should read

--$C(x) = 1(x \neq 0)$    Equation 5".

Col. 16, line 42, "71428" should be deleted.

Signed and Sealed this

Tenth Day of February, 2009

JOHN DOLL
*Acting Director of the United States Patent and Trademark Office*